(12) United States Patent
Atallah et al.

(10) Patent No.: US 11,494,061 B1
(45) Date of Patent: Nov. 8, 2022

(54) USING A NATURAL LANGUAGE INTERFACE TO GENERATE DASHBOARDS CORRESPONDING TO SELECTED DATA SOURCES

(71) Applicant: Tableau Software, LLC, Seattle, WA (US)

(72) Inventors: Ryan Andrew Atallah, Palo Alto, CA (US); Clark Wildenradt, Seattle, WA (US)

(73) Assignee: TABLEAU SOFTWARE, LLC, Seattle, WA (US)

( * ) Notice: Subject to any disclaimer, the term of this patent is extended or adjusted under 35 U.S.C. 154(b) by 0 days.

(21) Appl. No.: 17/357,912

(22) Filed: Jun. 24, 2021

(51) Int. Cl.
*G06F 3/0484* (2022.01)
*G06F 3/0482* (2013.01)
*G06F 40/205* (2020.01)
*G06F 9/451* (2018.01)
*G06F 40/169* (2020.01)
*G06F 40/274* (2020.01)
*G06F 16/25* (2019.01)
*G06F 40/279* (2020.01)

(52) U.S. Cl.
CPC .......... *G06F 3/0484* (2013.01); *G06F 3/0482* (2013.01); *G06F 9/451* (2018.02); *G06F 16/252* (2019.01); *G06F 40/169* (2020.01); *G06F 40/205* (2020.01); *G06F 40/274* (2020.01); *G06F 40/279* (2020.01)

(58) Field of Classification Search
CPC .... G06F 3/04847; G06F 3/167; G06F 11/206; G06F 16/248; G06F 16/26; G06F 16/90332; G06F 16/904
See application file for complete search history.

(56) References Cited

U.S. PATENT DOCUMENTS

| | | |
|---|---|---|
| 10,515,121 B1 * | 12/2019 | Setlur ................. G10L 15/1815 |
| 10,558,688 B1 | 2/2020 | Nguyen et al. |
| 2005/0080770 A1 | 4/2005 | Lueder et al. |
| 2009/0313576 A1 | 12/2009 | Neumann et al. |
| 2014/0244625 A1 | 8/2014 | Seghezzi et al. |

(Continued)

OTHER PUBLICATIONS

Atallah, Office Action, U.S. Appl. No. 17/368,783, dated Dec. 27, 2021, 38 pgs.

(Continued)

*Primary Examiner* — Seth A Silverman
(74) *Attorney, Agent, or Firm* — Morgan, Lewis & Bockius LLP

(57) ABSTRACT

A method generates a data visualization dashboard using a natural language interface. The method is performed at a computing device having a display, one or more processors, and memory. A user specifies a natural language input directed to a data source, using a first region of a graphical user interface. In response, the computing device parses the natural language input to identify one or more database entities from the data source. For each of the database entities, the computing device determines one or more respective analytical operations for the respective database entity. The device then generates a dashboard, which includes a plurality of data visualizations corresponding to distinct combinations of the analytical operations. The first dashboard is displayed in a second region of the graphical user interface, distinct from the first region.

20 Claims, 32 Drawing Sheets

(56) References Cited

U.S. PATENT DOCUMENTS

| | | | |
|---|---|---|---|
| 2015/0100588 A1* | 4/2015 | Allen .................... | G06F 16/243 |
| | | | 707/748 |
| 2016/0283091 A1 | 9/2016 | Hang et al. | |
| 2017/0308571 A1* | 10/2017 | McCurley ............. | G06F 16/243 |
| 2018/0329948 A1* | 11/2018 | Nijor ..................... | G06F 16/243 |
| 2019/0362009 A1 | 11/2019 | Miseldine et al. | |
| 2020/0012638 A1 | 1/2020 | Luo et al. | |
| 2020/0089700 A1 | 3/2020 | Ericson et al. | |
| 2020/0089760 A1 | 3/2020 | Ericson et al. | |
| 2020/0104401 A1 | 4/2020 | Burnett et al. | |
| 2020/0110779 A1* | 4/2020 | Setlur ..................... | G06F 40/30 |
| 2020/0110803 A1 | 4/2020 | Djalali et al. | |
| 2020/0293167 A1 | 9/2020 | Blyumen | |
| 2021/0117056 A1* | 4/2021 | Kuo ....................... | G06F 3/0484 |

OTHER PUBLICATIONS

D. Song et al., "Building and Querying an Enterprise Knowledge Graph," in IEEE Transactions on Services Computing, Vpl. 12, No. 3, pp. 356-369, May 1-Jun. 2019, doi: 10.1109/TSC.2017.2711600, (Year 2019).

F.Siasar Djahantighi, M. Norouzifard, S.H. Davarpanah and M.H. Shenassa, "Using Natural Language Processing in Order to Create SQL queries," 2008 International Conference on Computer and Communication Engineering, 2008, pp. 600-604, doi: 10.1109/ICCCE.2008.458067, (Year 2008).

* cited by examiner

1320 In response to receiving the first natural language input, parse the first natural language input, including identifying one or more database entities from the data source based on the first natural language input.

1323 For each of the database entities, determine one or more respective analytical operations for the respective database entity.

1324 When the one or more respective analytical operations for a database entity includes a filter operation, generate a data visualization by filtering rows of the data source to display only rows whose data value of a first data field equals a first data value.

1325 When the one or more respective analytical operations include a sort operation, generate a bar chart that includes data bars arranged in an ascending or descending order according to data values of a data field.

1326 Generate a first dashboard that includes a first plurality of data visualizations, each data visualization in the first plurality of data visualizations corresponding to a distinct combination of the analytical operations.

1327 Each of the first plurality of data visualizations has a respective data visualization type that is one of: a bar chart, a Gantt chart, a line chart, a map, a pie chart, a scatter plot, a tree map, or a text table.

Figure 13B

1320 In response to receiving the first natural language input, parse the first natural language input, including identifying one or more database entities from the data source based on the first natural language input.

1326 Generate a first dashboard that includes a first plurality of data visualizations, each data visualization in the first plurality of data visualizations corresponding to a distinct combination of the analytical operations.

1328 A first data visualization has a first interpretation. The computer system receives a user interaction with the first data visualization. In response to the user interaction, display, in a second graphical user interface, the first data visualization and an interpretation region. The interpretation region includes one or more phrases that define the first data visualization. The one or more phrases include grouping and/or filter operations that are applied to one or more data fields of the first data visualization.

1329 Receive user input in the interpretation region of the second graphical user interface to modify the first data visualization. The user input includes one or more of: removing an existing data field term that defines the first data visualization, adding a new data field term, replacing an existing data field term with another data field term from the data source, and/or removing one of the phrases that defines the first data visualization. In response to the user input, generate a second data visualization, and update the display of the second graphical user interface by (i) replacing the first data visualization with the second visualization and (ii) updating the one or more phrases in the interpretation region based on the user input.

1330 Update the display of the dashboard by replacing the first data visualization with the second data visualization and updating the first interpretation while maintaining the display of other visualizations in the first plurality of data visualizations.

1331 Display, in the interpretation region, a list of data fields in the data source, and receive user selection of a first data field from the data fields.

Figure 13C

1320 In response to receiving the first natural language input, parse the first natural language input, including identifying one or more database entities from the data source based on the first natural language input.

1326 Generate a first dashboard that includes a first plurality of data visualizations, each data visualization in the first plurality of data visualizations corresponding to a distinct combination of the analytical operations.

1332 Display the first dashboard in a second region of the graphical user interface, distinct from the first region.

1333 Display, adjacent to each of the data visualizations, a corresponding interpretation comprising a respective textual description of the respective data visualization.

1334 Receive user input in the first region to modify the first natural language input. In response to the input, parse the modified natural language input, including identifying a second database entity in the data source based on the modified natural language input. Generate a second dashboard that includes a second plurality of data visualizations. The second plurality of data visualizations includes at least one data visualization that is distinct from the first plurality of data visualizations by adding an analytical operation corresponding to the second database entity. Replace display of the first dashboard with the second dashboard.

1335 The second plurality of data visualization is distinct from the first plurality of data visualizations.

Figure 13D

USING A NATURAL LANGUAGE INTERFACE TO GENERATE DASHBOARDS CORRESPONDING TO SELECTED DATA SOURCES

RELATED APPLICATIONS

This application is related to the following applications, each of which is incorporated by reference herein in its entirety:
(i) U.S. patent application Ser. No. 15/486,265, filed Apr. 12, 2017, entitled "Systems and Methods of Using Natural Language Processing for Visual Analysis of a Data Set," now U.S. Pat. No. 10,515,121;
(ii) U.S. patent application Ser. No. 15/804,991, filed Nov. 6, 2017, entitled "Systems and Methods of Using Natural Language Processing for Visual Analysis of a Data Set";
(iii) U.S. patent application Ser. No. 15/978,062, filed May 11, 2018, entitled "Applying Natural Language Pragmatics in a Data Visualization User Interface";
(iv) U.S. patent application Ser. No. 15/978,066, filed May 11, 2018, entitled "Data Visualization User Interface Using Cohesion of Sequential Natural Language Commands";
(v) U.S. patent application Ser. No. 15/978,067, filed May 11, 2018, entitled "Updating Displayed Data Visualizations According to Identified Conversation Centers in Natural Language Commands";
(vi) U.S. patent application Ser. No. 16/219,406, filed Dec. 13, 2018, entitled "Identifying Intent in Visual Analytical Conversations";
(vii) U.S. patent application Ser. No. 16/134,892, filed Sep. 18, 2018, entitled "Analyzing Natural Language Expressions in a Data Visualization User Interface";
(viii) U.S. patent application Ser. No. 16/134,907, filed Sep. 18, 2018, entitled "Natural Language Interface for Building Data Visualizations, Including Cascading Edits to Filter Expressions";
(ix) U.S. patent application Ser. No. 16/166,125, filed Oct. 21, 2018, entitled "Determining Levels of Detail for Data Visualizations Using Natural Language Constructs";
(x) U.S. patent application Ser. No. 16/234,470, filed Dec. 27, 2018, entitled "Analyzing Underspecified Natural Language Utterances in a Data Visualization User Interface";
(xi) U.S. patent application Ser. No. 16/601,437, filed Oct. 14, 2019, entitled "Incremental Updates to Natural Language Expressions in a Data Visualization User Interface";
(xii) U.S. patent application Ser. No. 16/680,431, filed Nov. 11, 2019, entitled "Using Refinement Widgets for Data Fields Referenced by Natural Language Expressions in a Data Visualization User Interface";
(xiii) U.S. patent application Ser. No. 14/801,750, filed Jul. 16, 2015, entitled "Systems and Methods for using Multiple Aggregation Levels in a Single Data Visualization"; and
(xiv) U.S. patent application Ser. No. 16/681,754, filed Nov. 12, 2019, entitled "Using Natural Language Expressions to Define Data Visualization Calculations that Span Across Multiple Rows of Data from a Database."

TECHNICAL FIELD

The disclosed implementations relate generally to data visualization and more specifically to systems, methods, and user interfaces that enable users to interact with data visualizations and analyze data using natural language expressions.

BACKGROUND

Data visualization applications enable a user to understand a data set visually. Visual analyses of data sets, including distribution, trends, outliers, and other factors are important to making business decisions. Some data sets are very large or complex and include many data fields. Various tools can be used to help understand and analyze the data, including dashboards that have multiple data visualizations and natural language interfaces that help with visual analytical tasks.

SUMMARY

The use of natural language expressions to generate data visualizations provides a user with greater accessibility to data visualization features, including updating the fields and changing how the data is filtered. A natural language interface enables a user to develop valuable data visualizations with little or no training.

There is a need for improved systems and methods that support and refine natural language interactions with visual analytical systems. The present disclosure describes data visualization platforms that improve the effectiveness of natural language interfaces by resolving natural language utterances as they are being input by a user of the data visualization platform. Unlike existing interfaces that require natural language inputs to be composed of complete words and/or phrases, the present disclosure describes a natural language interface that provides feedback (e.g., generates interpretations, search results, or entity search results) in response to each subsequent additional keystroke that is input by the user.

The disclosed natural language interface also resolves ambiguities in natural language utterances by allowing a user to annotate a term in a natural language command. Annotation instructs the data visualization platform to interpret the term as a particular entity in the data source. Accordingly, by giving the user control over how a term should be disambiguated, the disclosed data visualization platforms enables more accurate visualizations to be generated. Accordingly, such methods and interfaces reduce the cognitive burden on a user and produce a more efficient human-machine interface. For battery-operated devices, such methods and interfaces conserve power and increase the time between battery charges. Such methods and interfaces may complement or replace conventional methods for visualizing data. Other implementations and advantages will be apparent to those skilled in the art in light of the descriptions and drawings in this disclosure.

In accordance with some implementations, a method of generating a dashboard using a natural language interface is performed at a computing device. The computing device has a display, one or more processors, and memory. The memory stores one or more programs configured for execution by the one or more processors. The computing device receives, in a first region of a graphical user interface, a first natural language input directed to a data source. In response to receiving the first natural language input, the computing device parses the first natural language input, thereby identifying one or more database entities from the data source based on the first natural language input. For each of the database entities, the computing device determines one or more respective analytical operations for the respective database entity. Next, the computing device generates a first dashboard, which includes a first plurality of data visualizations. Each data visualization in the first plurality of data visualizations corresponds to a distinct combination of the analytical operations. The first dashboard is then displayed in a second region of the graphical user interface, distinct from the first region.

In some implementations, the one or more database entities includes a data field from the data source. In some implementations, the one or more database entities includes a data value of a data field in the data source. In some implementations, the one or more database entities includes a data type of a data field. In some implementations, the one or more database entities includes an analytical operation. In some implementations, the one or more database entities includes a data visualization type.

In some implementations, each of the first plurality of data visualizations has a respective data visualization type that is one of: a bar chart, a Gantt chart, a line chart, a map, a pie chart, a scatter plot, a tree map, or a text table.

In some implementations, displaying the dashboard includes displaying, adjacent to each of the data visualizations, a corresponding interpretation comprising a respective textual description of the respective data visualization.

In some implementations, the plurality of data visualizations includes a first data visualization having a first interpretation. The computing device detects a user interaction with the first data visualization. In response to the user interaction, the computing device displays, in a second graphical user interface, the first data visualization and an interpretation region, which includes one or more phrases that define the first data visualization. The one or more phrases includes grouping and/or filter operations that are applied to one or more data fields used by the first data visualization.

In some implementations, the computing device receives user input in the interpretation region of the second graphical user interface to modify the first data visualization. The user input includes removing an existing data field term that defines the first data visualization. The user input also includes adding a new data field term. In some implementations, the user input replaces an existing data field term with another data field term from the data source. In some implementations, the user input removes one of the phrases that defines the first data visualization. In response to the user input, a second data visualization is generated. In some implementations, in response to a user input, the display of the second graphical user interface is updated by replacing the first data visualization with the second data visualization and updating the one or more phrases in the interpretation region based on the user input.

In some implementations, the display of the dashboard is updated by replacing the first data visualization with the second data visualization and updating the first interpretation while maintaining display of other data visualizations in the first plurality of data visualizations.

In some implementations, receiving user input to modify the first data visualization includes displaying, in the interpretation region, a list of data fields from the data source and receiving user selection of a first data field from the list of data fields.

In some implementations, receiving user input in the first region modifies the first natural language input. In response to the user input, the modified natural language input is parsed, thereby identifying a second database entity in the data source based on the modified natural language input. Additionally, a second dashboard is generated, which includes a second plurality of data visualizations. The second plurality of data visualizations includes at least one data visualization that is different from the first plurality of data visualizations based on adding an analytical operation corresponding to the second database entity. Additionally, the display of the first dashboard is replaced with the second dashboard.

In some implementations, the second plurality of data visualizations is distinct from the first plurality of data visualizations.

In some implementations, when the one or more respective analytical operations for a database entity include a filter operation, a data visualization is generated by filtering rows of the data source to display only rows whose data value of a first data field equals a first data value.

In some implementations, when the one or more respective analytical operations include a sort operation, generating a bar chart that includes data bars arranged in an ascending or descending order according to data values of a data field. In some implementations, the data values are individual raw data values. In some implementations, the data values are aggregated.

In some implementations, the user selects a data source prior to specifying the first natural language input.

In some implementations, the data source is determined based on the first natural language input.

In some implementations, the first natural language input includes a first term. Additionally, the computing device receives a keystroke corresponding to the first term. The computing device generates one or more suggestions corresponding to one or more database entities in the data source. In some implementations, the suggestions are displayed in a dropdown menu in the first region of the graphical user interface.

In some implementations, the computing device receives user selection of a first suggestion of the one or more suggestions. In response to the user selection, the first term is annotated. In some implementations, when the first suggestion corresponds to a first data value of a data field in the data source, annotating the first term establishes a fixed meaning that filters rows of the data source to display only rows whose data value of the data field equals the first data value. In some implementations, when the first suggestion corresponds to an analytical operation on a data field in the data source, annotating the first keyword establishes a fixed meaning that performs the analytical operation.

In some implementations, a computing device includes one or more processors, memory, and one or more programs stored in the memory. The programs are configured for execution by the one or more processors. The one or more programs include instructions for performing any of the methods described herein.

In some implementations, a non-transitory computer-readable storage medium stores one or more programs configured for execution by a computing device having one or more processors and memory. The one or more programs include instructions for performing any of the methods described herein.

Thus methods, systems, and graphical user interfaces are disclosed that enable users to easily interact with data visualizations and analyze data using natural language expressions.

BRIEF DESCRIPTION OF THE DRAWINGS

For a better understanding of the aforementioned systems, methods, and graphical user interfaces, as well as additional systems, methods, and graphical user interfaces that provide data visualization analytics, reference should be made to the Description of Implementations below, in conjunction with the following drawings in which like reference numerals refer to corresponding parts throughout the figures.

FIGS. 13A-13D provide a flow chart of the systems and methods for generating a dashboard according to some implementations.

Reference will now be made to implementations, examples of which are illustrated in the accompanying drawings. In the following description, numerous specific details are set forth in order to provide a thorough understanding of the present invention. However, it will be apparent to one of ordinary skill in the art that the present invention may be practiced without requiring these specific details.

DESCRIPTION OF IMPLEMENTATIONS

Some methods and devices disclosed in the present specification improve upon data visualization methods by generating and displaying interpretations in response to each subsequent additional keystroke of a partial natural language command (e.g., a command that contains incomplete words, phrases, and/or sentences), and by allowing a user to annotate a term in the natural language command, which in turn instructs a data visualization application to interpret the term as a particular entity in the data source. Such methods and devices improve user interaction with the natural language interface by providing quicker and easier incremental updates to natural language expressions related to a data visualization.

Figure 1:
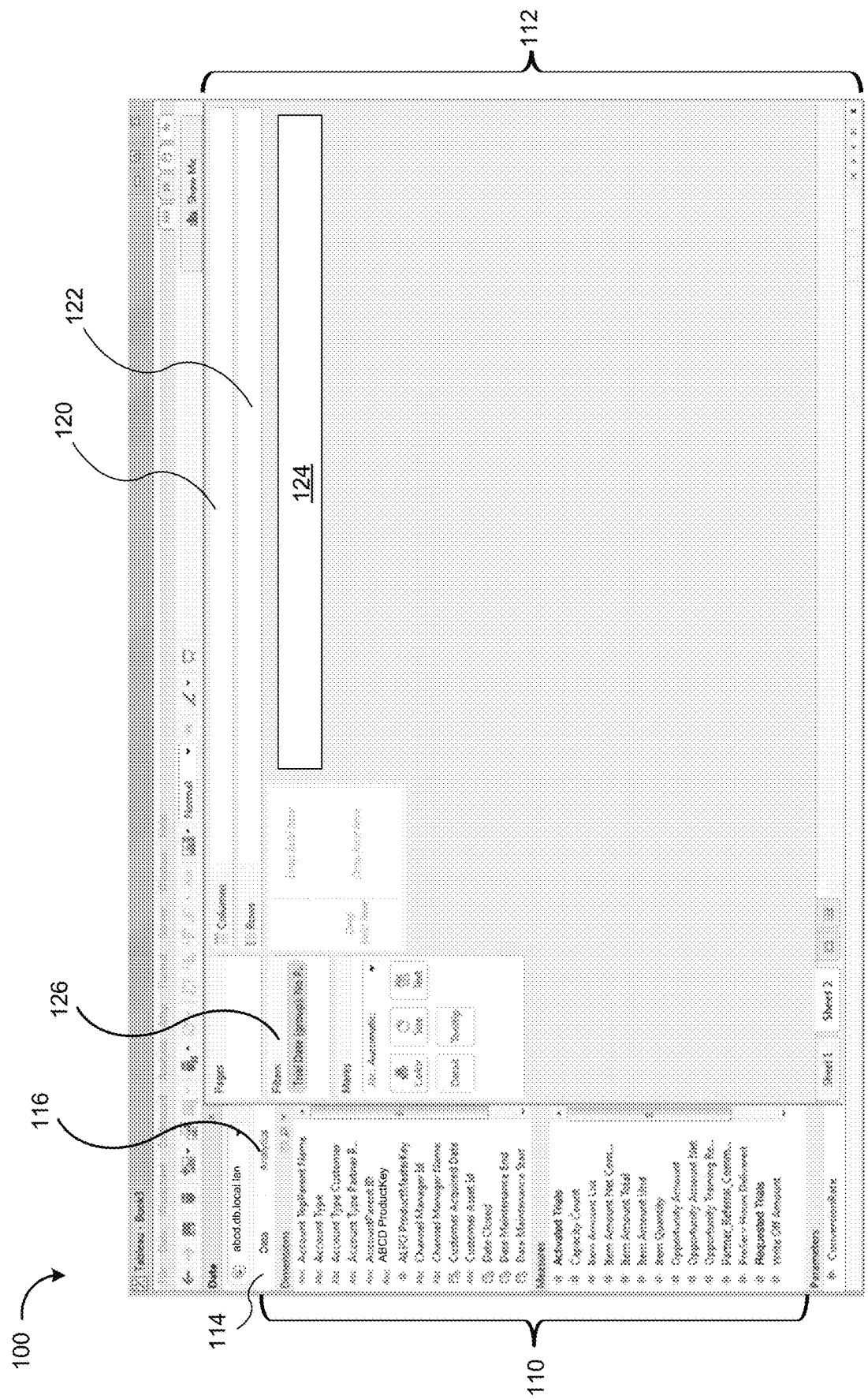
FIG. 1 illustrates a graphical user interface used in some implementations.

FIG. 1 illustrates a graphical user interface 100 for interactive data analysis. The user interface 100 includes a Data tab 114 and an Analytics tab 116 in accordance with some implementations. When the Data tab 114 is selected, the user interface 100 displays a schema information region 110, which is also referred to as a data pane. The schema information region 110 provides named data elements (e.g., field names) that may be selected and used to build a data visualization. In some implementations, the list of field names is separated into a group of dimensions (e.g., categorical data) and a group of measures (e.g., numeric quantities). Some implementations also include a list of parameters. When the Analytics tab 116 is selected, the user interface displays a list of analytic functions instead of data elements (not shown).

The graphical user interface 100 also includes a data visualization region 112. The data visualization region 112 includes a plurality of shelf regions, such as a columns shelf region 120 and a rows shelf region 122. These are also referred to as the column shelf 120 and the row shelf 122. As illustrated here, the data visualization region 112 also has a large space for displaying a visual graphic (also referred to herein as a data visualization). Because no data elements have been selected yet, the space initially has no visual graphic. In some implementations, the data visualization region 112 has multiple layers that are referred to as sheets. In some implementations, the data visualization region 112 includes a region 126 for data visualization filters.

In some implementations, the graphical user interface 100 also includes a natural language input box 124 (also referred to as a command box) for receiving natural language commands. A user may interact with the command box to provide commands. For example, the user may provide a natural language command by typing in the box 124. In addition, the user may indirectly interact with the command box by speaking into a microphone 220 to provide commands. In some implementations, data elements are initially associated with the column shelf 120 and the row shelf 122 (e.g., using drag and drop operations from the schema information region 110 to the column shelf 120 and/or the row shelf 122). After the initial association, the user may use natural language commands (e.g., in the natural language input box 124) to further explore the displayed data visualization. In some instances, a user creates the initial association using the natural language input box 124, which results in one or more data elements being placed on the column shelf 120 and on the row shelf 122. For example, the user may provide a command to create a relationship between a data element X and a data element Y. In response to receiving the command, the column shelf 120 and the row shelf 122 may be populated with the data elements (e.g., the column shelf 120 may be populated with the data element X and the row shelf 122 may be populated with the data element Y, or vice versa).

Figure 2A:
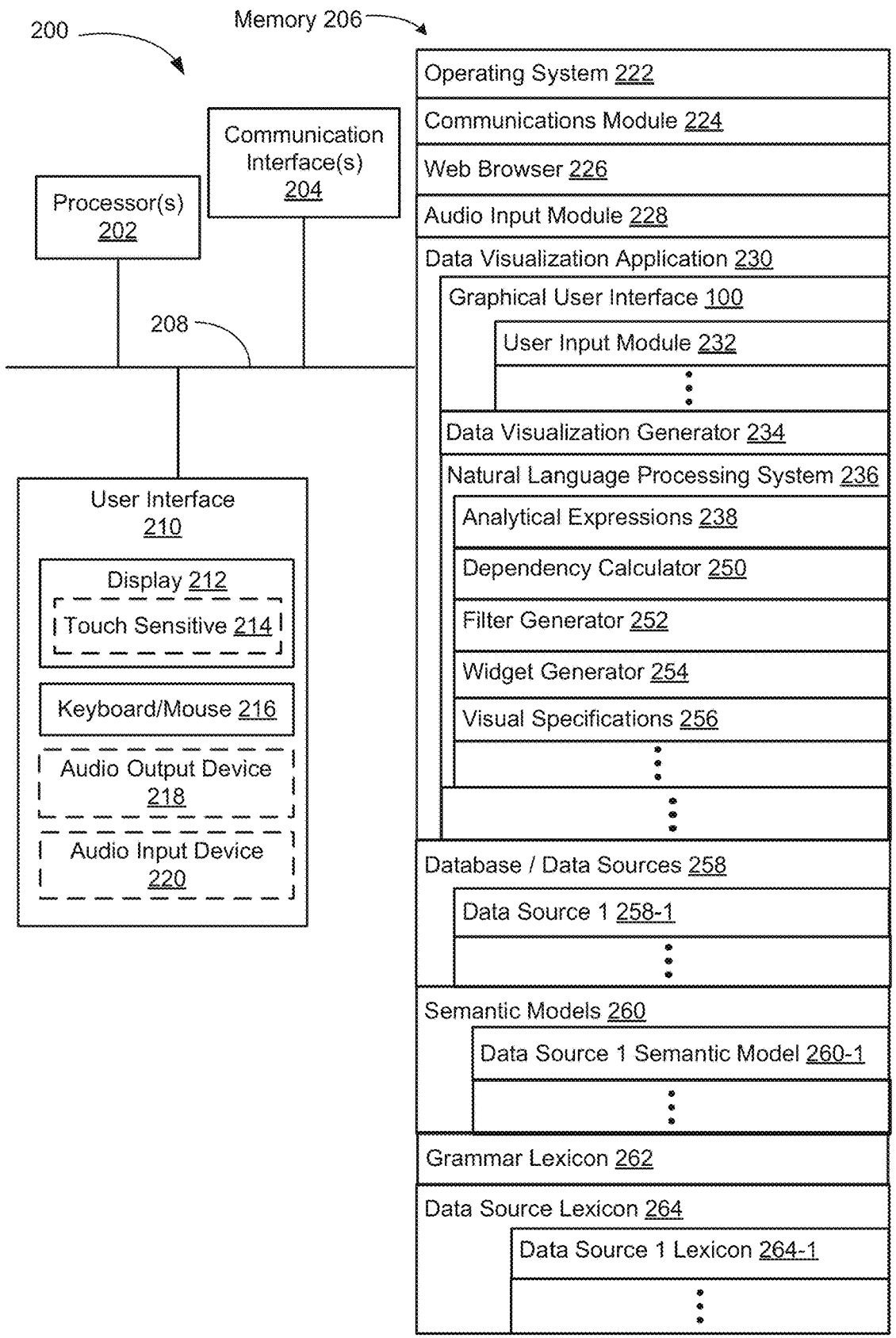
FIGS. 2A-2D are block diagrams of a computing device according to some implementations.

FIG. 2A is a block diagram illustrating a computing device 200 that can display the graphical user interface 100 in accordance with some implementations. Various examples of the computing device 200 include a desktop computer, a laptop computer, a tablet computer, and other computing devices that have a display and a processor capable of running a data visualization application 230. The computing device 200 typically includes one or more processing units (processors or cores) 202, one or more network or other communication interfaces 204, memory 206, and one or more communication buses 208 for interconnecting these components. In some implementations, the communication buses 208 include circuitry (sometimes called a chipset) that interconnects and controls communications between system components.

The computing device 200 includes a user interface 210. The user interface 210 typically includes a display device 212. In some implementations, the computing device 200 includes input devices such as a keyboard, mouse, and/or other input buttons 216. Alternatively or in addition, in some implementations, the display device 212 includes a touch-sensitive surface 214, in which case the display device 212 is a touch-sensitive display. In some implementations, the touch-sensitive surface 214 is configured to detect various swipe gestures (e.g., continuous gestures in vertical and/or horizontal directions) and/or other gestures (e.g., single/double tap). In computing devices that have a touch-sensitive display 214, a physical keyboard is optional (e.g., a soft keyboard may be displayed when keyboard entry is needed). The user interface 210 also includes an audio output device 218, such as speakers or an audio output connection connected to speakers, earphones, or headphones. Furthermore, some computing devices 200 use a microphone 220 and voice recognition to supplement or replace the keyboard. In some implementations, the computing device 200 includes an audio input device 220 (e.g., a microphone) to capture audio (e.g., speech from a user).

In some implementations, the memory 206 includes high-speed random-access memory, such as DRAM, SRAM, DDR RAM, or other random-access solid-state memory devices. In some implementations, the memory 206 includes non-volatile memory, such as one or more magnetic disk storage devices, optical disk storage devices, flash memory devices, or other non-volatile solid-state storage devices. In some implementations, the memory 206 includes one or more storage devices remotely located from the processors 202. The memory 206, or alternatively the non-volatile memory devices within the memory 206, includes a non-transitory computer-readable storage medium. In some implementations, the memory 206, or the computer-readable storage medium of the memory 206, stores the following programs, modules, and data structures, or a subset or superset thereof:

- an operating system 222, which includes procedures for handling various basic system services and for performing hardware dependent tasks;
- a communications module 224, which is used for connecting the computing device 200 to other computers and devices via the one or more communication interfaces 204 (wired or wireless), such as the Internet, other wide area networks, local area networks, metropolitan area networks, and so on;
- a web browser 226 (or other application capable of displaying web pages), which enables a user to communicate over a network with remote computers or devices;
- an audio input module 228 (e.g., a microphone module) for processing audio captured by the audio input device 220. The captured audio may be sent to a remote server and/or processed by an application executing on the computing device 200 (e.g., the data visualization application 230 or the natural language system 236);
- a data visualization application 230, which generates data visualizations and related features. In some implementations, the data visualization application 230 includes:
  - a graphical user interface 100 for a user to construct visual graphics. In some implementations, the graphical user interface includes a user input module 232 for receiving user input through the natural language box 124. For example, a user inputs a natural language command or expression into the natural language box 124 to identify one or more data sources 258 (which may be stored on the computing device 200 or stored remotely) and/or data fields from the data sources. In some implementations, the natural language expression is a voice utterance captured by the audio input device 220. The selected fields are used to define a visual graphic. The data visualization application 230 then displays the generated visual graphic in the user interface 100. In some implementations, the data visualization application 230 executes as a stand-alone application (e.g., a desktop application). In some implementations, the data visualization application 230 executes within the web browser 226 or another application using web pages provided by a web server;
  - a data visualization generator 234, which automatically generates and displays a corresponding visual graphic (also referred to as a "data visualization" or a "data viz") using the user input (e.g., the natural language input);
  - a natural language system 236, which receives and parses the natural language input provided by the user. The natural language system 236 may identify analytical expressions 238, which are described in FIG. 2B.
  - the natural language system 236 may also include a dependency calculator 250, which looks up dependencies in a database 258 to determine how particular terms and/or phrases are related (e.g., dependent);
  - in some implementations, the natural language system 236 includes a filter generator 252, which determines if one or more filters are related to a field that has been modified by a user. The filter generator 252 generates the one or more filters based on user selections;
  - a widget generator 254, which generates widgets that include user-selectable options. For example, a "sort" widget is generated in response to a user selecting (e.g., hovering) over a sort field (e.g., a natural language term identified to be a sort field). The sort widget includes user-selectable options such as "ascending," "descending," and/or "alphabetical," so that the user can easily select, from the widget, how to sort the selected field; and
  - visual specifications 256, which are used to define characteristics of a desired data visualization. In some implementations, the information the user provides (e.g., user input) is stored as a visual specification. In some implementations, the visual specifications 256 include previous natural language commands received from a user or properties specified by the user through natural language commands. In some instances, a visual specification 256 includes two or more aggregations based on different levels of detail. Further information about levels of detail can be found in U.S. patent application Ser. No. 14/801,750, filed Jul. 16, 2015, titled "Systems and Methods for using Multiple Aggregation Levels in a Single Data Visualization," and U.S. patent application Ser. No. 16/166,125, filed Oct. 21, 2018, titled "Determining Levels of Detail for Data Visualizations Using Natural Language Constructs," each of which is incorporated by reference herein in its entirety; and
- zero or more databases or data sources 258 (e.g., a first data source 258-1), which are used by the data visualization application 230. In some implementations, the data sources are stored as spreadsheet files, CSV files, XML files, flat files, or JSON files, or stored in a relational database. For example, a user selects one or more databases or data sources 258 (which may be stored on the computing device 200 or stored remotely), selects data fields from the data source(s), and uses the selected fields to define a visual graphic.

zero or more semantic models 260 (e.g., a first semantic model 260-1), each of which is derived directly from a respective database or data source 258. The semantic model 260 represents the database schema and contains metadata about attributes. In some implementations, the semantic model 260 also includes metadata of alternative labels or synonyms of the attributes. The semantic model 260 includes data types (e.g., "text," "date," "geospatial," "Boolean," and "numeric"), attributes, (e.g., a currency type such as the United States Dollar), and a semantic role (e.g., the "City" role for a geospatial attribute) for data fields of the respective database or data source 258. In some implementations, the semantic model 260 also captures statistical values (e.g., data distribution, range limits, average, and cardinality) for each attribute. In some implementations, the semantic model 260 is augmented with a grammar lexicon 262, which contains a set of analytical concepts 266 found in many query languages (e.g., average, filter, and sort). In some implementations, the semantic model 260 also distinguishes between attributes that are measures (e.g., attributes that can be measured, aggregated, or used for mathematical operations) and dimensions (e.g., fields that cannot be aggregated except by counting). Thus, the semantic model 260 helps with inferencing and choosing salient attributes and values;

a grammar lexicon 262, which includes analytical concepts 266 (see FIG. 2C) that are used to support the analytical expressions 238 for forming intermediate expressions; and zero or more data source lexicons 264 (e.g., a first data source lexicon 264-1), each of which is associated with a respective database or data source 258. Details of the components of a data source lexicon are described in FIG. 2D.

In some implementations the computing device 200 further includes an inferencing module (not shown), which is used to resolve underspecified (e.g., omitted information) or ambiguous (e.g., vague) natural language commands (e.g., expressions or utterances) directed to the databases or data sources 258, using one or more inferencing rules. Further information about the inferencing module can be found in U.S. patent application Ser. No. 16/234,470, filed Dec. 27, 2018, titled "Analyzing Underspecified Natural Language Utterances in a Data Visualization User Interface," which is incorporated by reference herein in its entirety.

In some implementations, canonical representations are assigned to the analytical expressions 238 (e.g., by the natural language system 236) to address the problem of proliferation of ambiguous syntactic parses inherent to natural language querying. The canonical structures are unambiguous from the point of view of the parser and the natural language system 236 is able to choose quickly between multiple syntactic parses to form intermediate expressions. Further information about the canonical representations can be found in U.S. patent application Ser. No. 16/234,470, filed Dec. 27, 2018, titled "Analyzing Underspecified Natural Language Utterances in a Data Visualization User Interface," which is incorporated by reference herein in its entirety.

Although FIG. 2A shows a computing device 200, FIG. 2A is intended more as a functional description of the various features that may be present rather than as a structural schematic of the implementations described herein. In practice, and as recognized by those of ordinary skill in the art, items shown separately could be combined and some items could be separated.

Figure 2B:
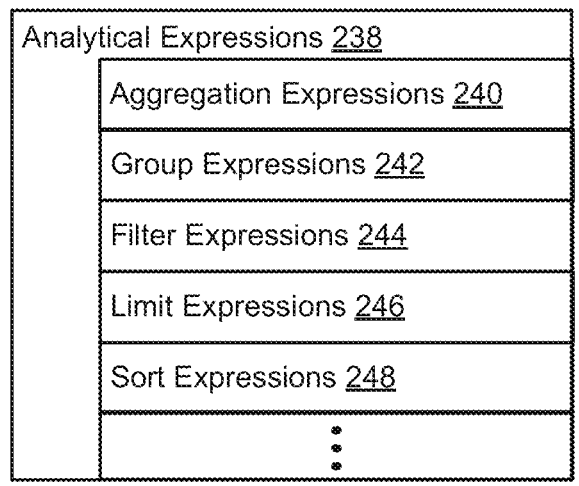

FIG. 2B is block diagram illustrating the analytical expressions 238 of the natural language system 236, in accordance with some implementations. The analytical expressions 238 include:

aggregation expressions 240. For example, "average Sales" is an aggregate expression that includes an aggregate term "average" and an attribute "Sales." In some implementations, the aggregation expressions 240 are in the canonical form [agg att], where agg∈Aggregations and att is an Attribute;

group expressions 242. For example, "by Region" is a group expression that includes a group term "by" and an attribute "Region." In some implementations, the group expressions 242 are in the canonical form [grp att], where grp∈Groups and att is an attribute;

filter expressions 244. For example, "Customer Name starts with John" is a filter expression that contains an attribute "Customer Name," a filter "starts with," and a value "John." In some implementations, the filter expressions 244 are in the canonical form [att filter val], where att is an attribute, filter∈Filters, and val E Values;

limit expressions 246. For example, "top 5 Wineries by sum of Sales" is a limit expression that contains a limit term "top", a value "5", a group by attribute "Wineries," and an aggregation expression "sum of Sales." In some implementations, the limit expressions 246 are in the canonical form [limit val ge ae], where limit∈Limits, val∈Values, ge∈group expressions, and ae∈aggregation expressions; and sort expressions 248. For example, in "sort Products in ascending order by sum of Profit," the phrase "ascending order" is the sort term, "Products" is the attribute to group by, and "sum of Profit" is the aggregation expression. In some implementations, the sort expressions 248 are in the canonical form [sort ge ae], where sort∈Sorts, ge∈group expressions, and ae E aggregation expressions.

Figure 2C:
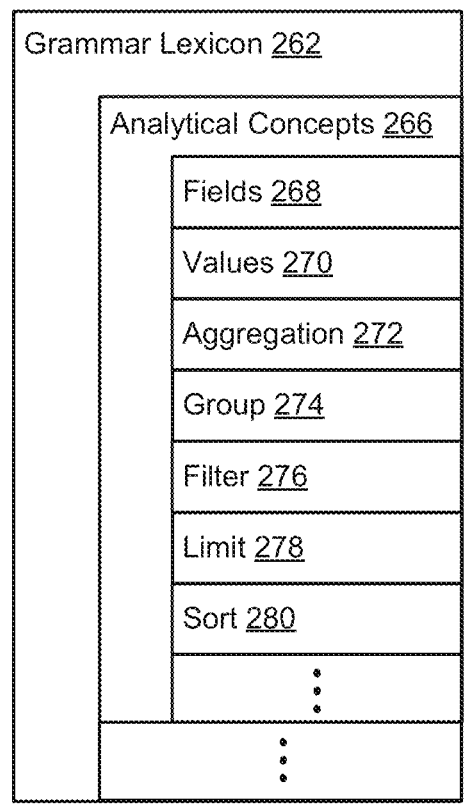

FIG. 2C is a block diagram illustrating components of a grammar lexicon 262 according to some implementations. In some implementations, the grammar lexicon comprises analytical concepts 266 that support the formation of analytical expressions 238. The analytical concepts 266 include:

a field 268 concept, which is a finite set of database fields. Examples of field concepts include "Sales," and "Product Category";

a value 270 concept, which is a finite set of values for a database field. Examples of value concepts include the value 10,500,000.00 for a Sales data field and the value "Chairs" for a Product Category data field;

an aggregation 272 concept, which is a finite set of operators that aggregate the values of multiple rows to form a single value based on a mathematical operation. Examples of aggregation concepts include "sum," "average," "median," "count," and "distinct count";

a group 274 concept, which is a finite set of operators that partitions the data into categories. An example of a group concept includes the "by" key value;

a filter 276 concept, which is a finite set of operators that return a subset of rows from the database. Examples of filter concepts include "filter to," "at least," "between," and "at most";

a limit 278 concept, which is a finite set of operators (akin to the filters 276) that return a subset of rows from the database, restricting to n rows, where $1 \le n \le N$, and N is the total number of rows in the domain. Examples of limit concepts include "top" and "bottom"; and a sort 280 concept, which is a finite set of operators that arranges data rows in an order. Examples of sort concepts include "ascending," "descending," and "alphabetical."

Figure 2D:
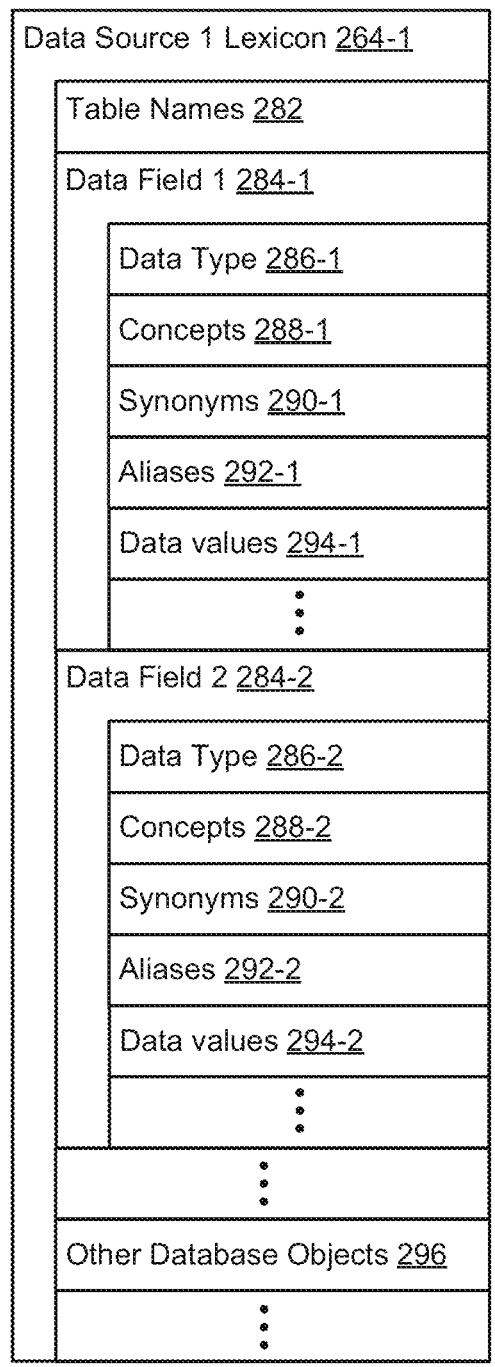

FIG. 2D is a block diagram illustrating components of a first data source lexicon 264-1, in accordance with some implementations. The first data source lexicon 264-1 includes table names 282 corresponding to names of one or more tables of the first data source 258-1, a plurality of data fields 284 of the first data source 258-1, and other database objects 296. Each data field 284 includes:

a data type 286, such as integer, string, date, or floating point numeric;

one or more concepts 288 that are used to interpret the data field. For example, a data value "Michael" may be interpreted using the concepts such as a "string," "name," "gender (e.g., male)," "singer," "basketball player," and/or "chef" In some implementations, the one or more concepts are derived from elastic searches;

one or more synonyms 290, which are defined by the system. For example, a data field "average" may include synonyms such as "mean" and "avg";

zero or more aliases 292, which are defined by the user. For example, a data field "goods" may include aliases such as "widgets," "bananas," and "my favorite field"; and data values 294, which are some or all of the distinct values for a data field. This is particularly useful for low cardinality string data fields. In some instances, the set of stored data values 294 for a data field 284 in a lexicon 264 is limited to data values with threshold usage in the data field 284 (e.g., include a data value 294 in the lexicon when the data value appears in at least a threshold number of rows for the data field 284).

In some implementations, a data source lexicon 264 includes other database objects 296 as well.

In some implementations, the computing device 200 also includes other modules such as an autocomplete module, which displays a dropdown menu with a plurality of candidate options when the user starts typing into the input box 124, and an ambiguity module to resolve syntactic and semantic ambiguities between the natural language commands and data fields (not shown). Details of these sub-modules are described in U.S. patent application Ser. No. 16/134,892, titled "Analyzing Natural Language Expressions in a Data Visualization User Interface, filed Sep. 18, 2018, which is incorporated by reference herein in its entirety.

Figure 3:
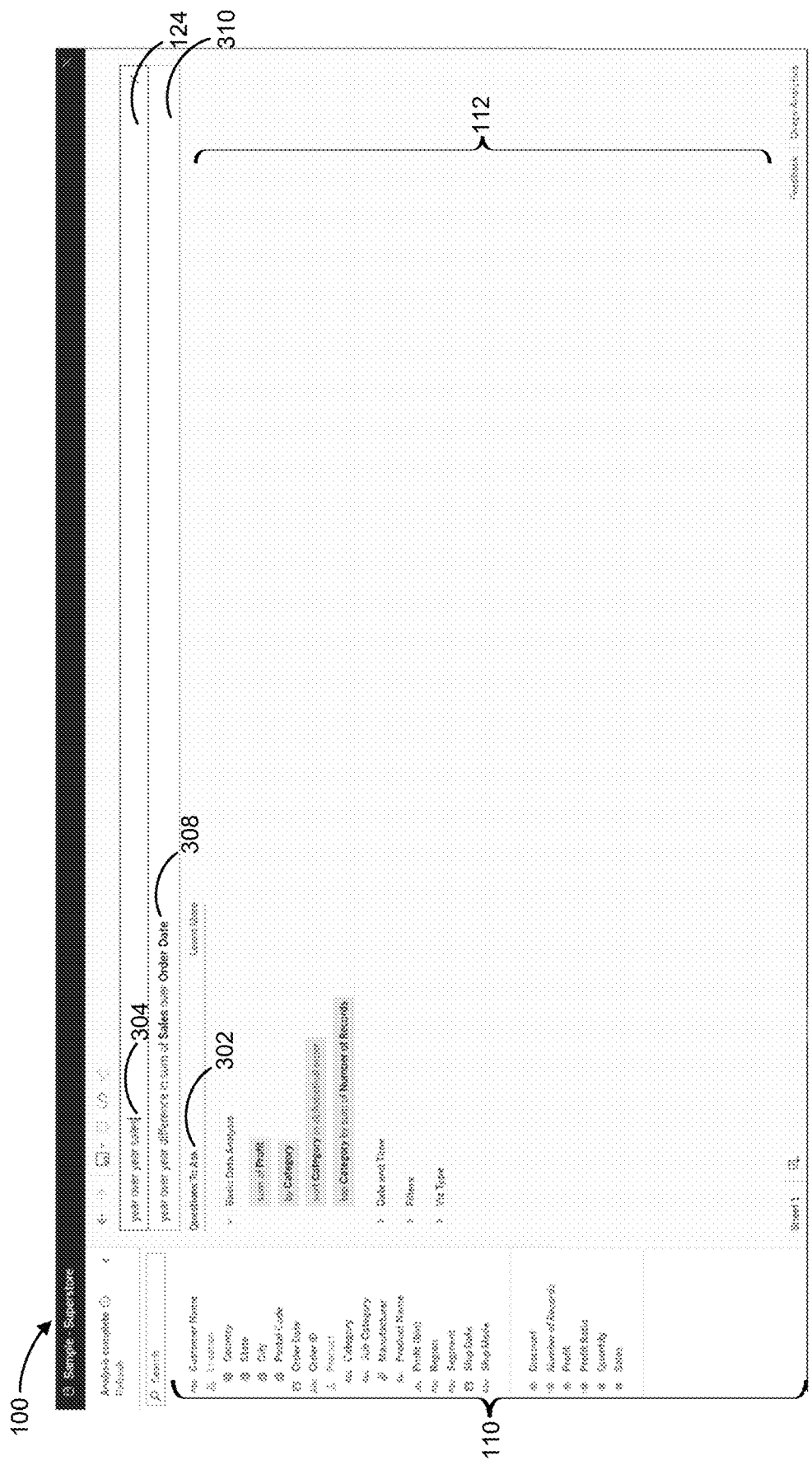
FIG. 3 provides a screenshot for a graphical user interface according to some implementations.

Each of the above identified executable modules, applications, or sets of procedures may be stored in one or more of the memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, the memory 206 stores a subset of the modules and data structures identified above. Furthermore, the memory 206 may store additional modules or data structures not described above FIG. 3 is a screen shot of a graphical user interface 100 according to some implementations. In some implementations, as illustrated in FIG. 3, the data visualization region 112 displays suggestions 302 (e.g., tips or pointers) to assist the user in interacting with the data source. Further details about the suggestions 302 are described in U.S. patent application Ser. No. 16/601,437, filed Oct. 14, 2019, entitled "Incremental Updates to Natural Language Expressions in a Data Visualization User Interface," which is incorporated by reference herein in its entirely.

In the example of FIG. 3, a user is interacting with a data source 258. The schema information region 110 provides named data elements (e.g., field names) from the data source 258, which may be selected and used to build a data visualization.

FIG. 3 illustrates a user interaction with the graphical user interface 100. In this example, the user inputs (e.g., enters or types) a natural language expression (e.g., a natural language command) 304 "year over year sales" in the command box 124. The user may also input the natural language expression by speech, which is then captured using an audio input device 220 (e.g. a microphone) coupled to the computing device 200. Typically, the natural language expression includes one or more terms that identify data fields from the data source 258. A term may be a dimension (e.g., categorical data) or a measure (e.g., a numerical quantity). As illustrated by the example, the natural language input typically includes one or more terms that correspond to data fields (e.g., the term "sales" identifies a data field from the data source).

In some implementations, parsing of the natural language expression is triggered in response to the user input. In this example, the natural language command 304 includes the terms "year over year," which specifies a table calculation type.

In response to the natural language command 304, the graphical user interface 100 displays an interpretation 308 (also referred to as a proposed action) in an interpretation box 310. In some implementations, as illustrated in FIG. 3, the field names "Sales" and "Order Date" are displayed in a visually distinctive manner (e.g., in boldface) relative to other words included in the interpretation 308.

Figure 4A:
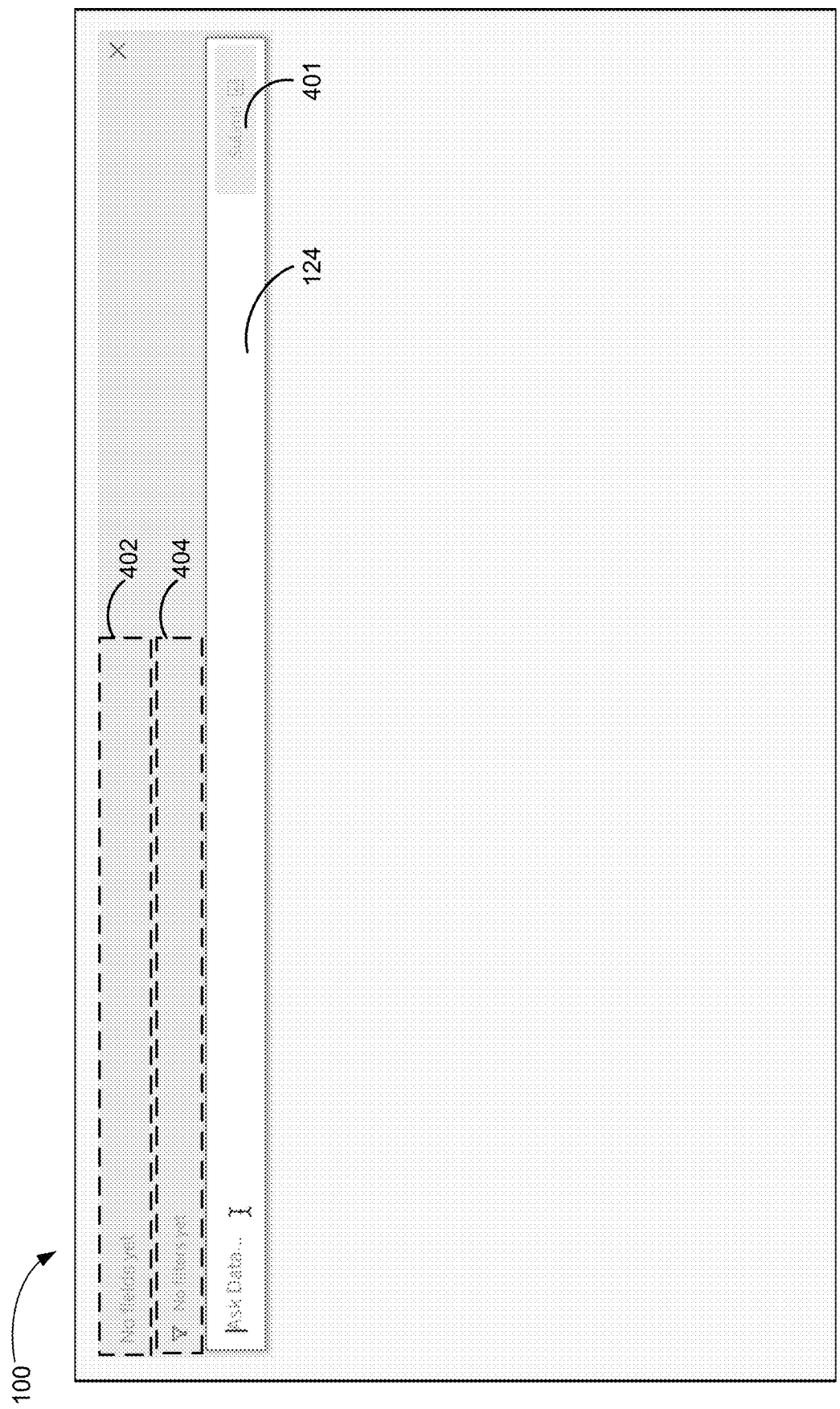
FIGS. 4A and 4B provide a series of screen shots for interactions with a graphical user interface according to some implementations.
Figure 4B:
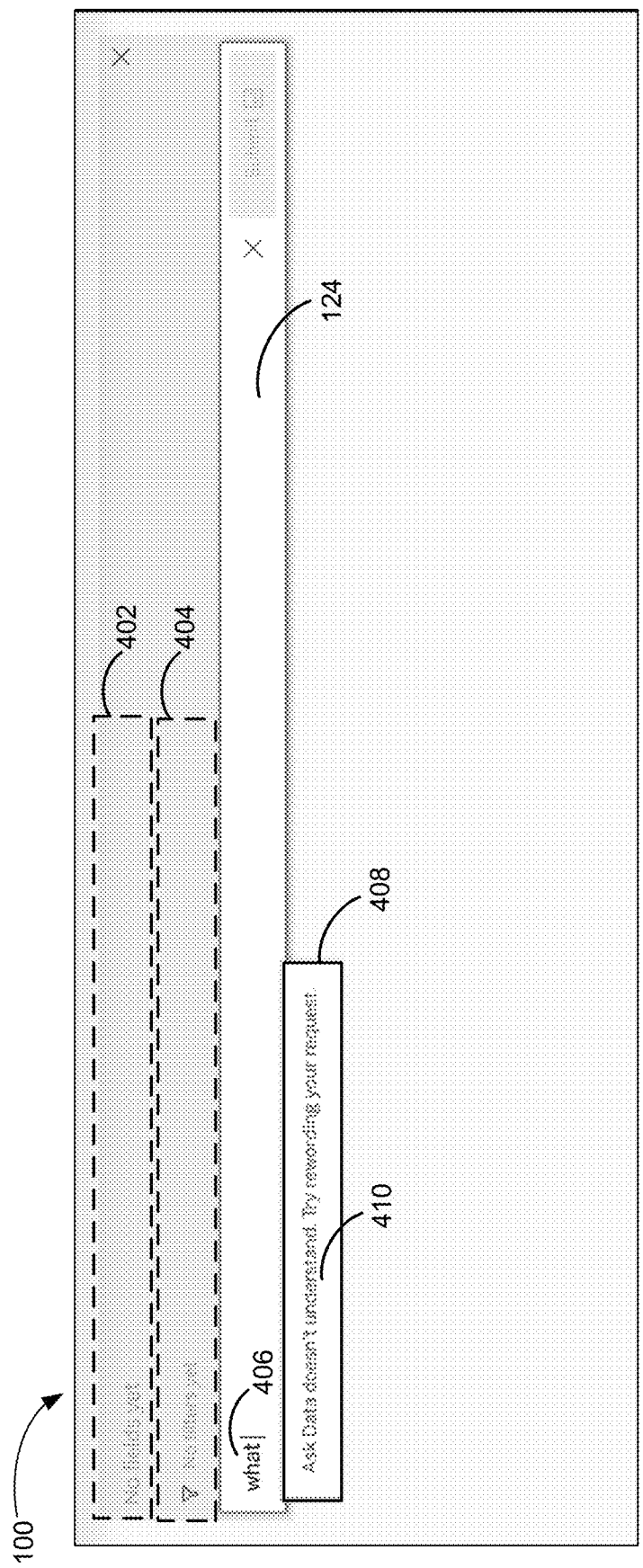

FIGS. 4A and 4B provide a series of screen shots for a graphical user interface 100 according to some implementations.

FIG. 4A provides a screen shot for a partial view of a graphical user interface 100 according to some implementations.

In some implementations, as illustrated in FIG. 4A, the graphical user interface 100 has a natural language input box 124 for receiving natural language commands from a user. The natural language input box 124 includes a graphical control element 401 (e.g., a "Submit" affordance) that, when selected by a user, causes a natural language command in the input box 124 to be transmitted to the computing system 200 (e.g., the natural language system 236) for analysis and/or interpretation. In some implementations, the computing system 200 generates a visualization (e.g., a data visualization) in response to the analysis and/or interpretation and returns the visualization for display on the graphical user interface 100. In this example, the graphical control element 401 is deactivated (e.g., grayed out) because the graphical user interface 100 has yet to receive a natural language command.

In some implementations, the graphical user interface 100 also comprises a data field interpretation region 402 and a filter interpretation region 404, which are located adjacent to (e.g., above) the natural language input box 124. The data field interpretation region 402 displays how the natural language system 236 interprets the natural language input from a user in light of the selected data source. The filter interpretation region 404 displays the filter(s) that are applied to data fields of the data source 258 in response to the natural language input from the user. In this example, no interpretation is displayed in the regions 402 and 404 because the graphical user interface 100 has yet to receive a natural language command.

FIG. 4B illustrates a user interaction with the graphical user interface 100. In this example, the user inputs (e.g., enters or types) a partial natural language expression 406 "what" into the command box 124. In general, the expression can be a command, an input, or an utterance that includes partial or incomplete words, phrases, and/or sentences. The user may also input the natural language expression by speech, which is then captured using an audio input device 220 (e.g. a microphone) coupled to the computing device 200. In response to the natural language command 406, the graphical user interface 100 displays a dropdown menu 408 that includes a statement 410 (e.g., "Ask Data does not understand. Try rewording your request.") Typically, a natural language expression includes one or more terms that identify entities (e.g., a data field, a data value of a data field, an analytical operation, and/or a data visualization type) from the data source 258. In this example, the natural language system 236 generates and displays the statement 410 because it is unable to identify an entity of the data source 258 that corresponds to the partial language expression 406.

Figure 5A:
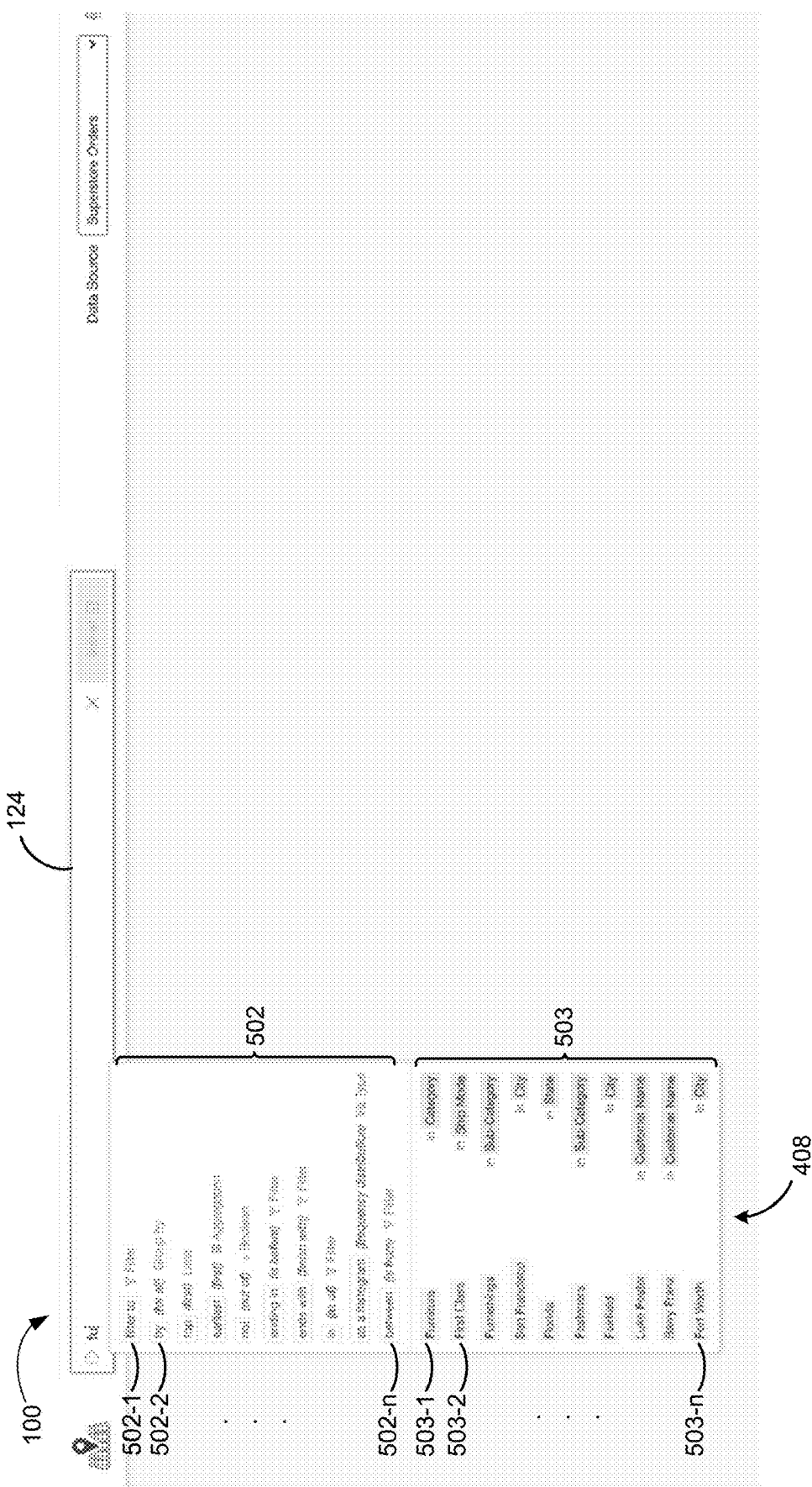
FIGS. 5A and 5B provide a series of screen shots for interactions with a graphical user interface according to some implementations.
Figure 5B:
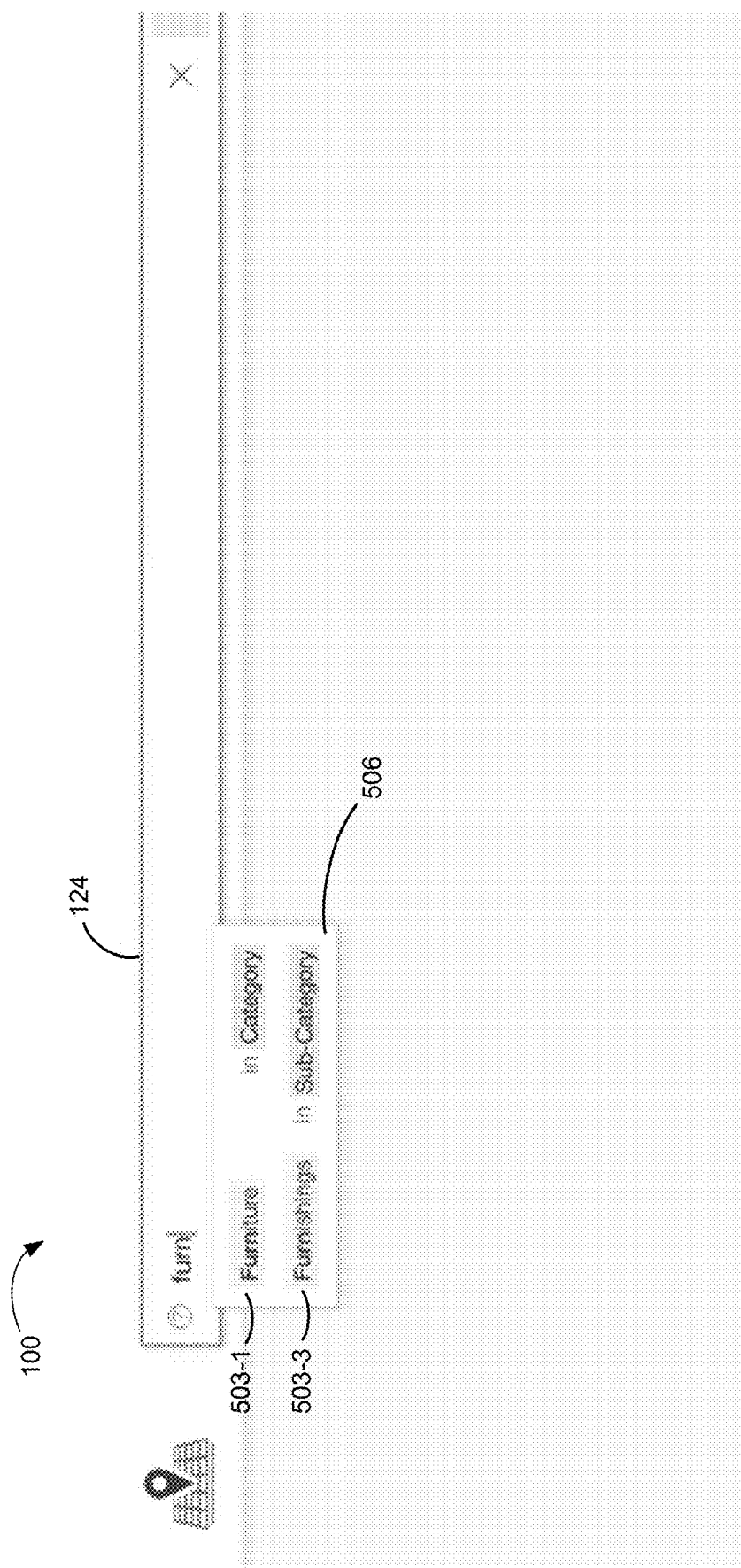

FIGS. 5A and 5B illustrate another user interaction with the graphical user interface 100. In this example, the user inputs alternative keystrokes (e.g., "fu"). In response to the keystrokes, the graphical user interface 100 displays a plurality of entity interpretations 503 and command interpretations 502 in the dropdown menu 408. For example, the command interpretations 502 include commands corresponding to the input "f". For example, the list of command interpretations 502 may have the letter "f" in the command itself, or in the description of the command (e.g., the first command 502-1 is a "filter to" command, and the second command 502-2 is a group by command which filters by "for all"). The command may be an aggregation, a limit (e.g., top or first), a frequency distribution (e.g., as a histogram), or any other filter (e.g., the nth command 502-n).

Each of the entity interpretations 503 is generated by the natural language system 236 and includes an entity from the data source 258. In the example of FIG. 5A, each of the entity interpretations 503 identifies a distinct data value 503-1, 503-2, . . . 503-n from the data source 258 and its corresponding data field. Each of the data values contains the letters "F" or "fu" corresponding to the keystrokes "fu" of the most recently entered term. For example, the first data value 503-1 recites "furniture" and shows that the data field Category contains the first data value 503-1. In another example, data value 503-2 recites "first class," which is a data value for the Ship Mode data field. Other entity interpretations 503 may be associated with the Category or Sub-Category data fields (e.g., furniture, furnishings, or fasteners), the City data field (e.g., San Francisco, Fairfield, or Fort Worth 503-n), the State data field (e.g., Florida), or the Customer Name data field (e.g., Luke Foster or Barry Franz). As illustrated in FIG. 5A, the letters "fu" in the entity interpretations 503 are displayed in a visually distinctive manner (e.g., boldface) compared to the remaining characters of each data value 503-1.

In some implementations, as illustrated in FIG. 5B, the horizontal position of the dropdown menu 408 changes based on the position of a most recently entered term (or keystroke) in the natural language input box 124. In this example, the user inputs additional keystrokes (i.e., the letters "rn"), which are appended to the partial natural language input "fu" in FIG. 5A. In response to the additional keystrokes, the graphical user interface 100 displays updated entity interpretations 506. Each of the entity interpretations identifies a distinct data value 503-1 or 503-3 for a data field from the data source 258.

In the example of FIG. 5B, each of the data values 503-1 and 503-3 in the entity interpretations 506 includes the letters "furn," which is a combination of the keystrokes (e.g., "fu") and the additional keystroke (e.g., the letter "rn"). In some implementations, a partial natural language input (e.g., "fu", the keystrokes "rn," or the combination of the keystrokes and the additional keystroke that forms "furn") comprise a character string. A character string may include a string of letters that forms part of a word, such as the letters "dis" of the word "distribution." A character string may be a word (e.g., "sales", "price," or "profit"). A character string may be more than one word, separated by a white space between words, such as "San Francisco." A character string may include complete words as well as letters of a word.

In the example of FIG. 5B, the keystrokes (e.g., the letters "rn") are appended to the end of the partial natural language input "fu." In some implementations, the user may click on any portion of the partial natural language input and insert the keystrokes at that position.

In some implementations, the natural language system 236 generates one or more tokens from the character string. A token may include one letter (e.g., a letter of a word, such as the latter "rn"), two letters, three or more letters (e.g., letters of a word, e.g., furniture, furnishings), one word (e.g., the word "furniture"), two or more words, and/or one or more phrases that is formed by combining two or more consecutive words. A token generally represents a semantically meaningful string, and is typically separated from other tokens by whitespace or punctuation.

Referring again to FIG. 5B, the natural language system 236 expands the keystrokes "furn" to form the token "furniture" (e.g., a word), or "furnishings" (e.g., a word) and interprets the token according to the data source 258 and/or a lexicon 264 for the data source 258. The user then has the option to select which of the tokens is the intended token. The process of tokenization is also described in U.S. patent application Ser. No. 16/166,125, filed Oct. 21, 2018, titled "Determining Levels of Detail for Data Visualizations Using Natural Language Constructs," which is hereby incorporated by reference herein in its entirety.

As shown in FIG. 5B, a subset 506 of the interpretations overlap with (e.g., are the same as) the interpretations 503 that are illustrated in FIG. 5A. For example, the interpretation 503-1 and the interpretation 503-3 both specify data values that include the partial user entry "furn", although they are in different data fields (i.e., "Category" or "Sub-Category"). In some implementations, some of the interpretations are different from the previous interpretations. Furthermore, the order in which an interpretation is displayed can change as a result of an additional keystroke in the partial natural language input. For example, the data value 503-3 "Furnishings," which appears as the third item in the interpretations 503 in FIG. 5A, is displayed as the second interpretation 503-3 in FIG. 5B.

In some implementations, the order to the entity interpretations in the list depends on estimated probabilities of selection by the user. Because of this, a given entity interpretation can move up or down on the list based on additional keystrokes.

In some implementations, when one or more terms in the partial natural language command include one or more terms that are recognized by the natural language system 236, the graphical control element 401 becomes activated. A user may at this point select the graphical control element 401 to cause the partial natural language command in the input box 124 to be transmitted to the data visualization application 230 for analysis (using the first interpretation). Alternatively, the user may continue to modify the partial language command, such as providing additional keystrokes, modifying or deleting existing terms, and/or selecting an alternative interpretation.

In some implementations, a user can interact with (e.g., hover over, click, or select) the graphical user interface 100 using an input device such as a mouse. In some implementations, the data visualization application 230 also includes one or more keyboard shortcuts, which provide an alternative (or additional) way for the user to interact with the graphical user interface 100. In some implementations, the keyboard shortcuts include one or more of: the <Tab> key (to move to the next option), the <Down> key (e.g., the down arrow key on the keyboard, to move to the next option), the <Up> key (e.g., the up arrow key on the keyboard, to move up on the list of options), and the <Enter> key (to select the currently highlighted interpretation).

Figure 6A:
FIGS. 6A and 6B provide a series of screen shots for interactions with a graphical user interface according to some implementations.
Figure 6B:
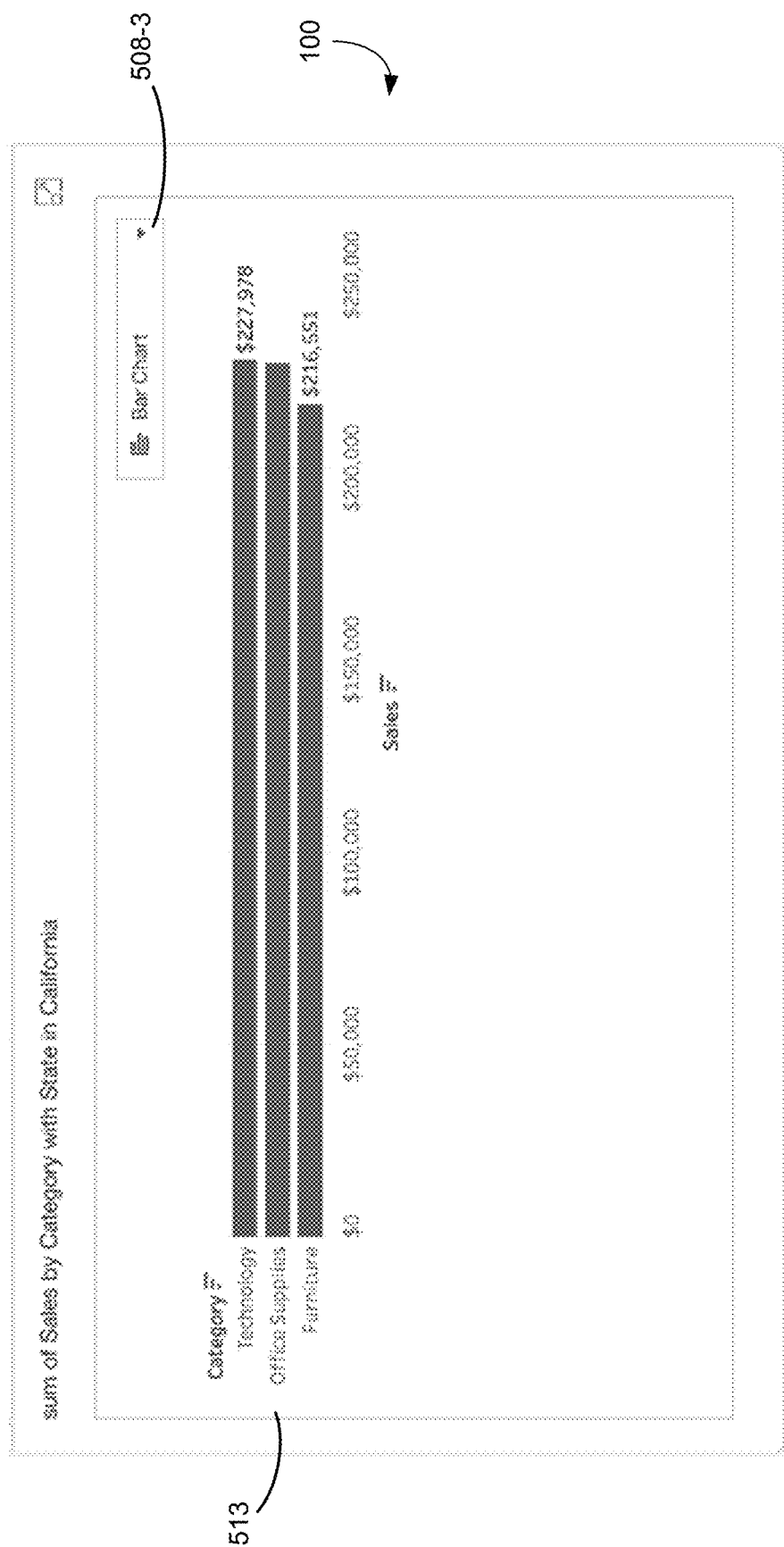

FIGS. 6A and 6B provide a series of screen shots for interactions with a graphical user interface according to some implementations. FIG. 6A illustrates user specification of a natural language expression that includes the three concepts "Furniture" 505-1, "Sales" 505-2, and "California" 505-3 in the input box 124. The dashboard automatically updates based on the user input and interpretations. In some implementations, the dashboard includes multiple graphs corresponding to the natural language expression. In some implementations, based on the user input into the input box, the computing system automatically displays multiple visualizations most suitable for the request.

For example, in FIG. 6A, a text table 510 displays the "sum of Sales with State in California and filter Category to Furniture" In this example, the text table 510 is a single monetary number summarizes all of the furniture sales for the state of California. In this example, the single monetary value represented in the text table 510 is the most requested visualization for sales in a state. In some implementations, the text table 510 has a table drop-down menu 508-1, which the user can select a different visualization of the data. In some implementations, the dashboard only presents one visualization. In some implementations, the dashboard presents two or more data visualizations.

In some implementations, a second visualization 511 represents the data (by color) as a map visualization. It uses a scale 509 to represent the sales in each state. In some implementations, consecutive graphs or tables may show a comparison with another data value in the input box (e.g., compare furniture sales in California with sales in other states). In this example, the states are color shaded over a range from lowest sales to highest sales, thus comparing the sales in California with other states. In this example, the data corresponds to all states, not just the requested state. In this example, the second visualization 511 is presented second, because it is not the closest match (e.g., most commonly requested or closest relation to data). In some implementations, the user may select a drop-down menu 508-2 to change the data visualization type.

FIG. 6B illustrates a third visualization 513, which is a bar chart in which the data values "Sales" and "California" are used, but "furniture" is compared to other categories. In this example, the bar chart 513 compares the sales of furniture to the sales of office supplies and sales of technology equipment. The bar chart 513 may present a series of categories that are compared. In some implementations, the bar chart may be manipulated to add or remove categories. In some implementations, the bar chart 513 includes a table drop-down menu 508-3 in which the user may select a different visualization type to be displayed.

Figure 7A:
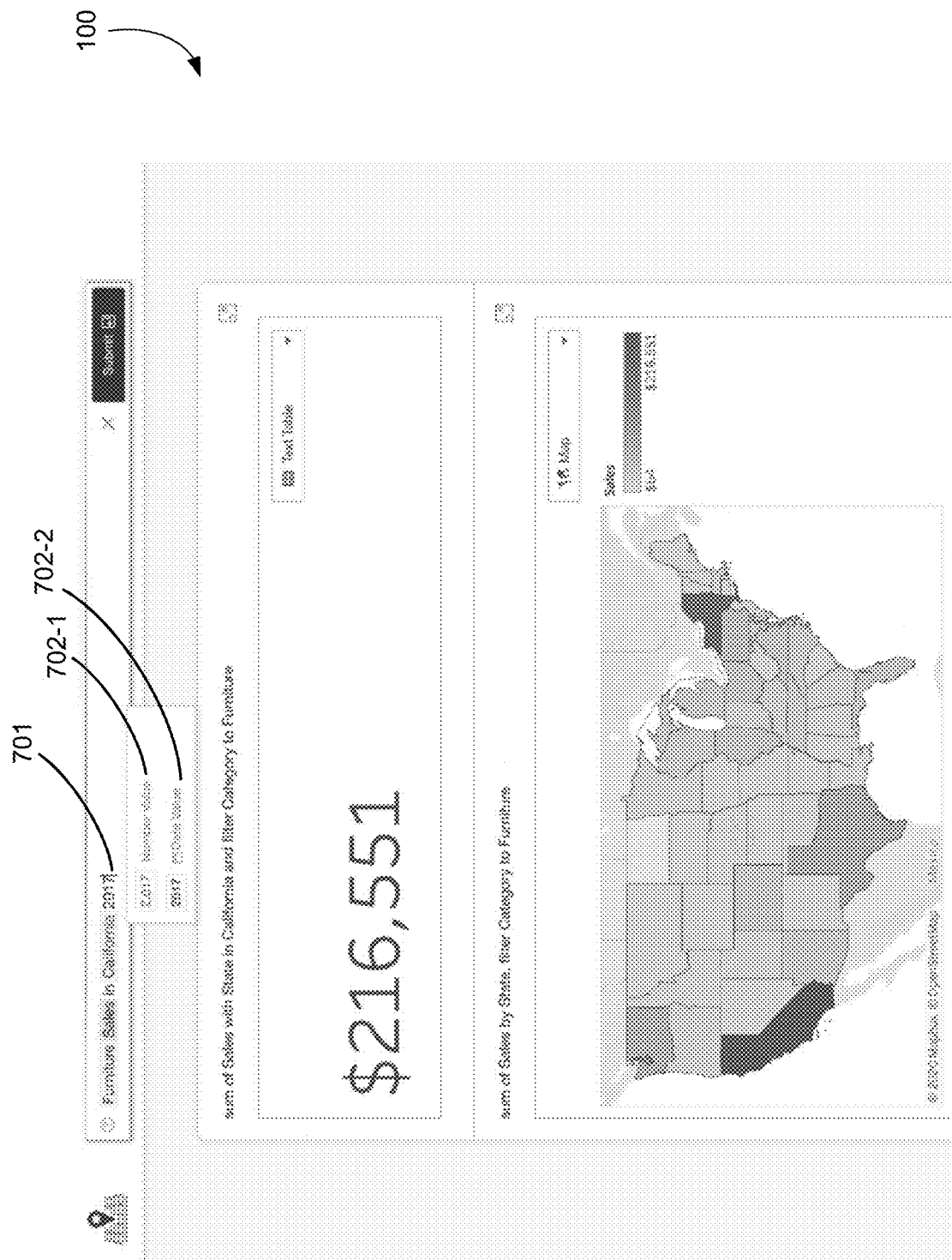
FIGS. 7A-7E provide a series of screen shots for interactions with a graphical user interface according to some implementations.

FIGS. 7A-7E provide a series of screen shots for interactions with a graphical user interface according to some implementations. FIG. 7A illustrates a user's ability to add information (e.g., letters, numbers, or interpretations) to update the information presented (e.g., visualizations) on the dashboard. For example, the user may add additional information to the input box 124 to filter the information being presented in the dashboard, or to provide a more accurate figure. In FIG. 7A, the user included text 701 "2017" into the input box 124. The computing system provides two interpretations for the user's input: the first interpretation 702-1 interprets the text 701 to be a numerical value (e.g., price or quantity); the second interpretation 702-2 interprets the text 701 to be a date value (e.g., in the year 2017).

Figure 7B:
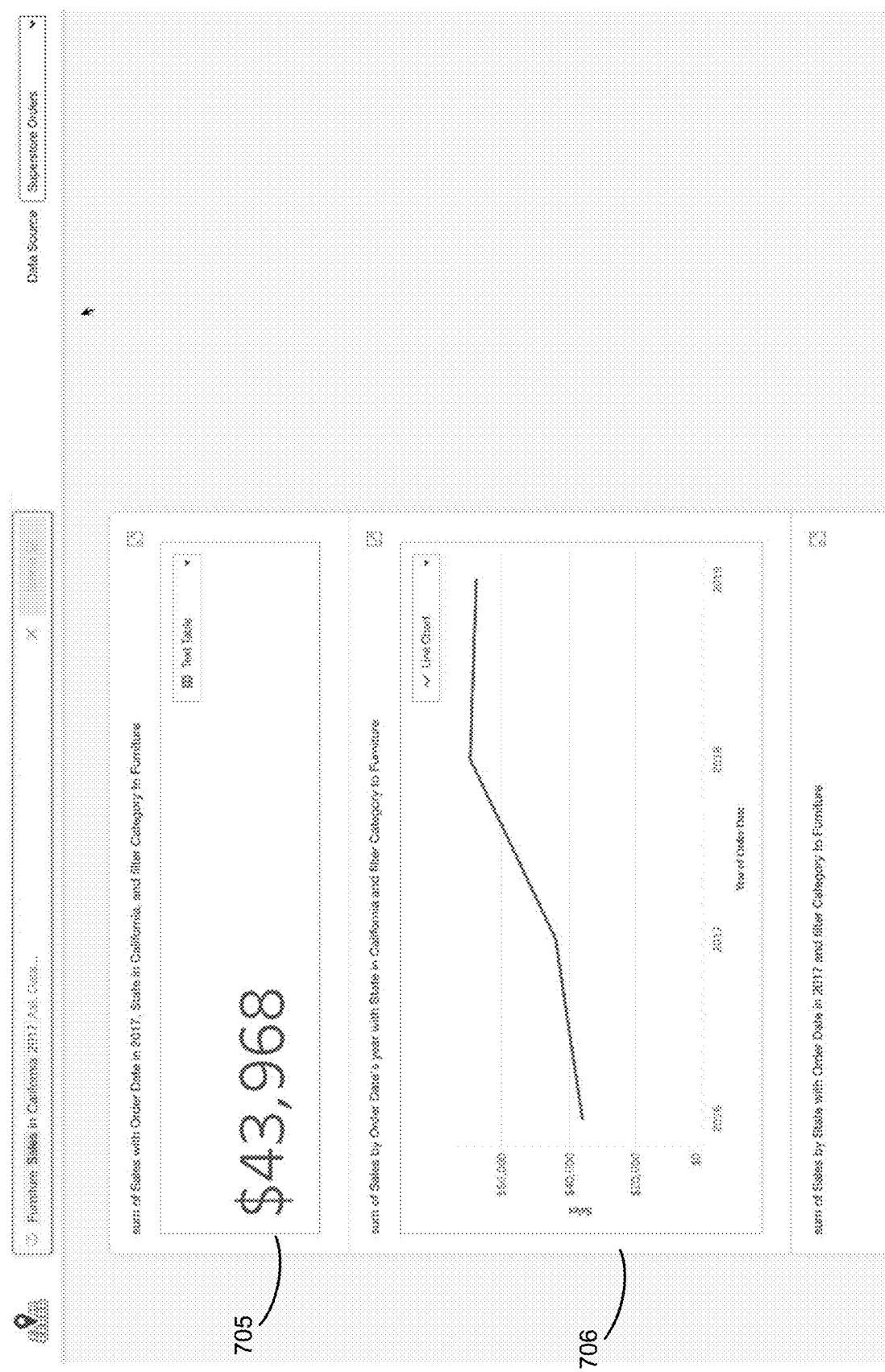

FIG. 7B shows the updated dashboard based on the additional text "2017" in FIG. 7A. In some implementations, the new visualization graphs (e.g., text table, map, line chart, or bar chart) are the same visualizations as in the previous entry. In some implementations, the new visualization graphs are different from the visualizations in the previous entry. In some implementations, the visualizations automatically update when the user has locked in the text (e.g., by pressing keys as discussed above, or selecting an interpretation). FIG. 7B illustrates one or more visualizations that have been updated based on the updated text. For example, although the first visualization 705 is a text table, the information presented is limited to orders in 2017. Additionally, as shown in FIG. 7B, a new visualization 706 is presented that was not previously presented. In this example, the new visualization 706 shows a line graph of the furniture sales across various years and a trend corresponding to the amount of sales throughout the years.

Figure 7C:
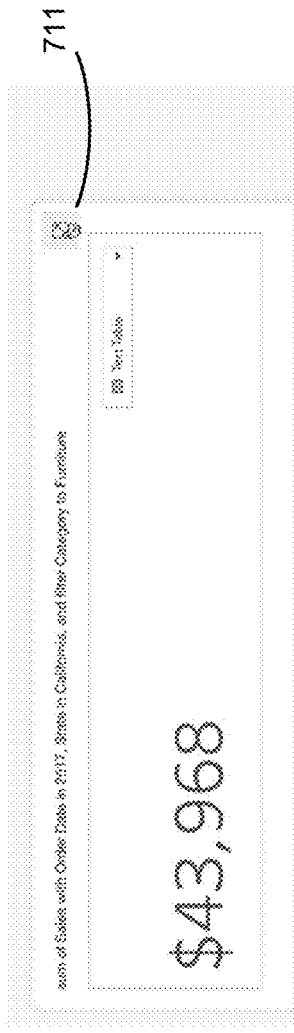
Figure 7D:
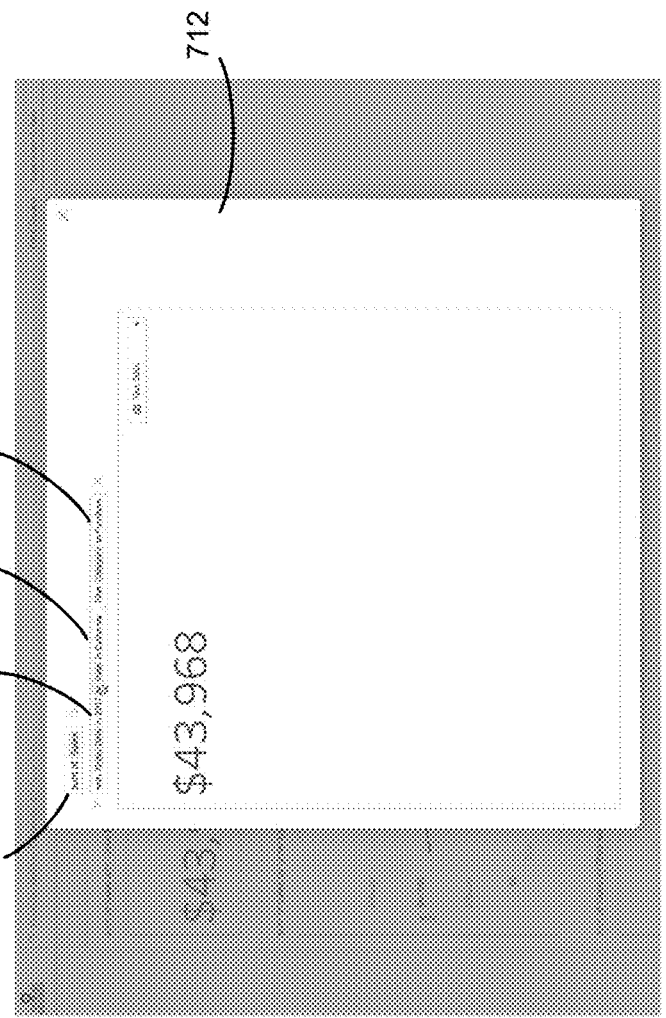

FIGS. 7C and 7D illustrates an expansion icon 711 associated with an individual visualization, in which the user has the ability to modify the specified visualization. In some implementations, by selecting the expansion icon 711, a new window 712 (as shown in FIG. 7D) is presented. In some implementations, the new window 712 overlays the existing dashboard. In some implementations, the new window 712 takes up a portion of the existing dashboard. In some implementations, the new window 712 is highlighted and the existing dashboard is grayed out. In some implementations, the existing dashboard is disabled while the new window 712 is presented. The new window 712 displays the filters (e.g., the filters 712-2, 712-3, and 712-4) added by the user. In some implementations, the user is able to interact with the filters. For example, the user may add or remove a specific filter (e.g., the user may remove the Order Date in 2017 as shown by interaction with filter 712-2). In some implementations, the removal of a filter requires a user input to exit (e.g., close, remove) the filter. In some implementations, when the user removes a specific filter (e.g., filter 712-2, 712-3, or 712-4), the new window 712 automatically updates the visualization without impacting the dashboard.

Figure 7E:
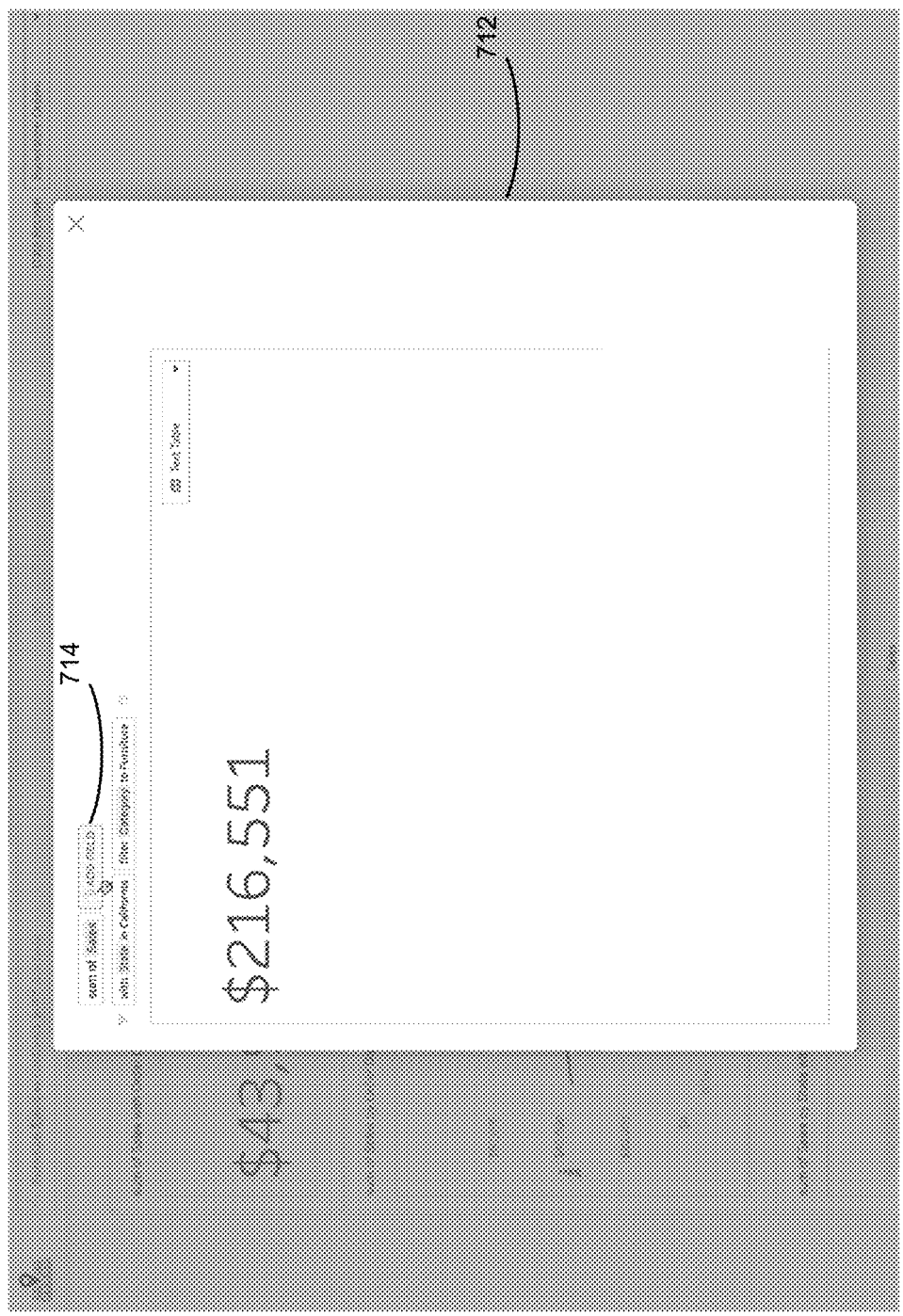

For example, FIG. 7E illustrates an automatic update of the visualization being displayed in the new window 712 after the user has removed one of the filters. In this example, the user removed the "Order Date in 2017" filter. In some implementations, the visualization is automatically updated. In some implementations, the visualization stays the same. In some implementations, the user is able to change the visualization type. In some implementations, a add icon 714 is displayed. In some implementations, by selecting the ADD button 714, the user is able to add a new filter (e.g., based on another data field) to the visualization. In some implementations, the addition of a new filter does not change the dashboard. In some implementations, the addition of a new filter automatically updates the visualization.

FIGS. 8A-8D provide a series of screen shots for interactions with a graphical user interface according to some implementations. As illustrated above in FIGS. 4A and 4B, the user interface includes a data field interpretation region 402 and a filter interpretation region 404. The ADD FIELD button 714 can be used to add a data field that will not be used as a filter.

Figure 8A:
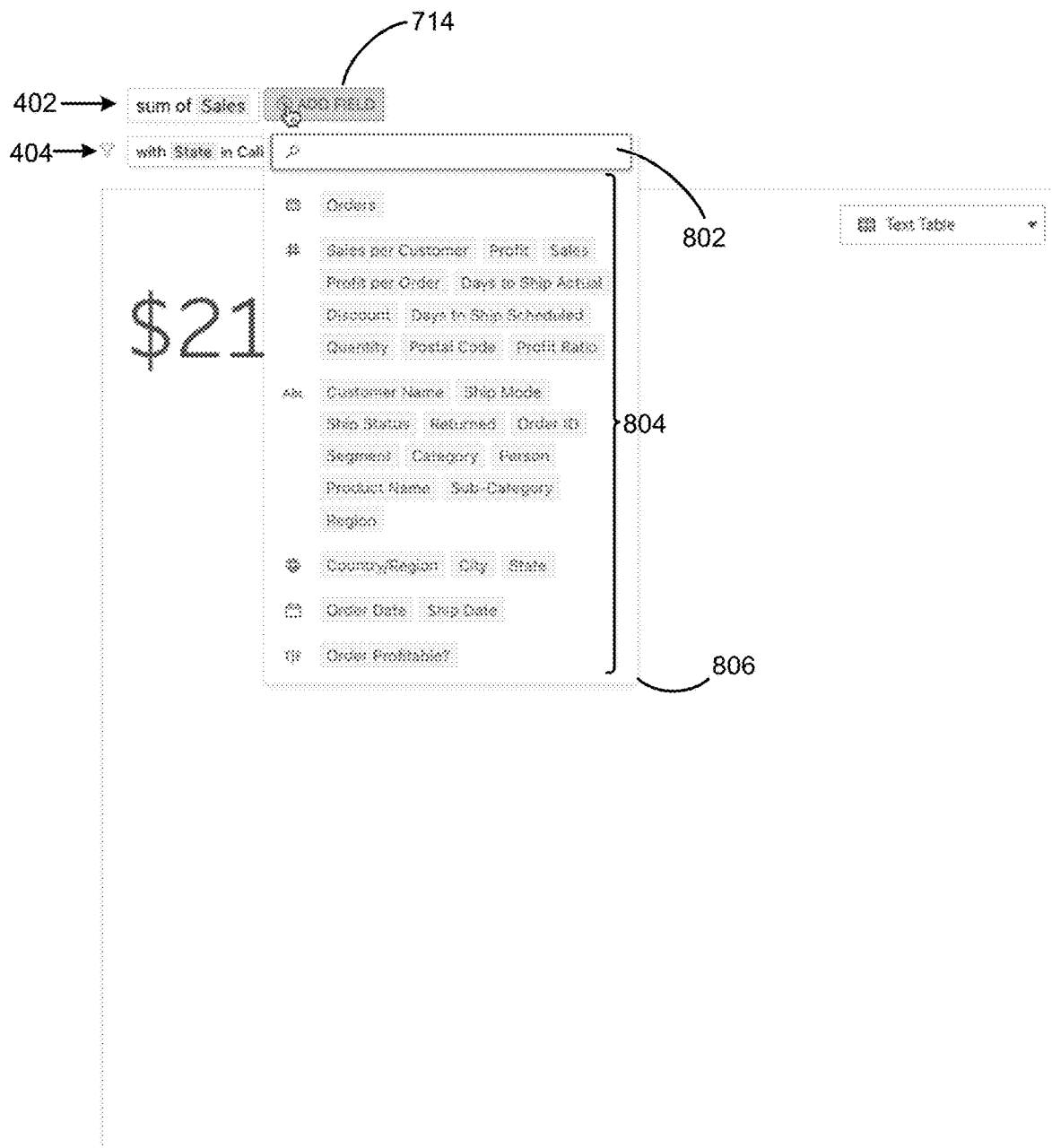
FIGS. 8A-8D provide a series of screen shots for interactions with a graphical user interface according to some implementations.

FIG. 8A illustrates a drop-down menu 806 presenting a list of data fields 804 for the user to select in response to the user selecting the "ADD FIELD" button. In some implementations, the drop-down menu 806 includes a search field 802. The search field 802 allows the user to search for a specific data field. In some implementations, the drop-down menu 806 includes a plurality of suggested data fields. In some implementations, the drop-down menu 806 includes a plurality of data fields that are most commonly used. In some implementations, the drop-down menu 806 includes the data fields most recently used. In some implementations, the drop-down menu 806 includes data fields based on user input, in which the user has pre-selected a group of data fields commonly used for filters.

Figure 8B:
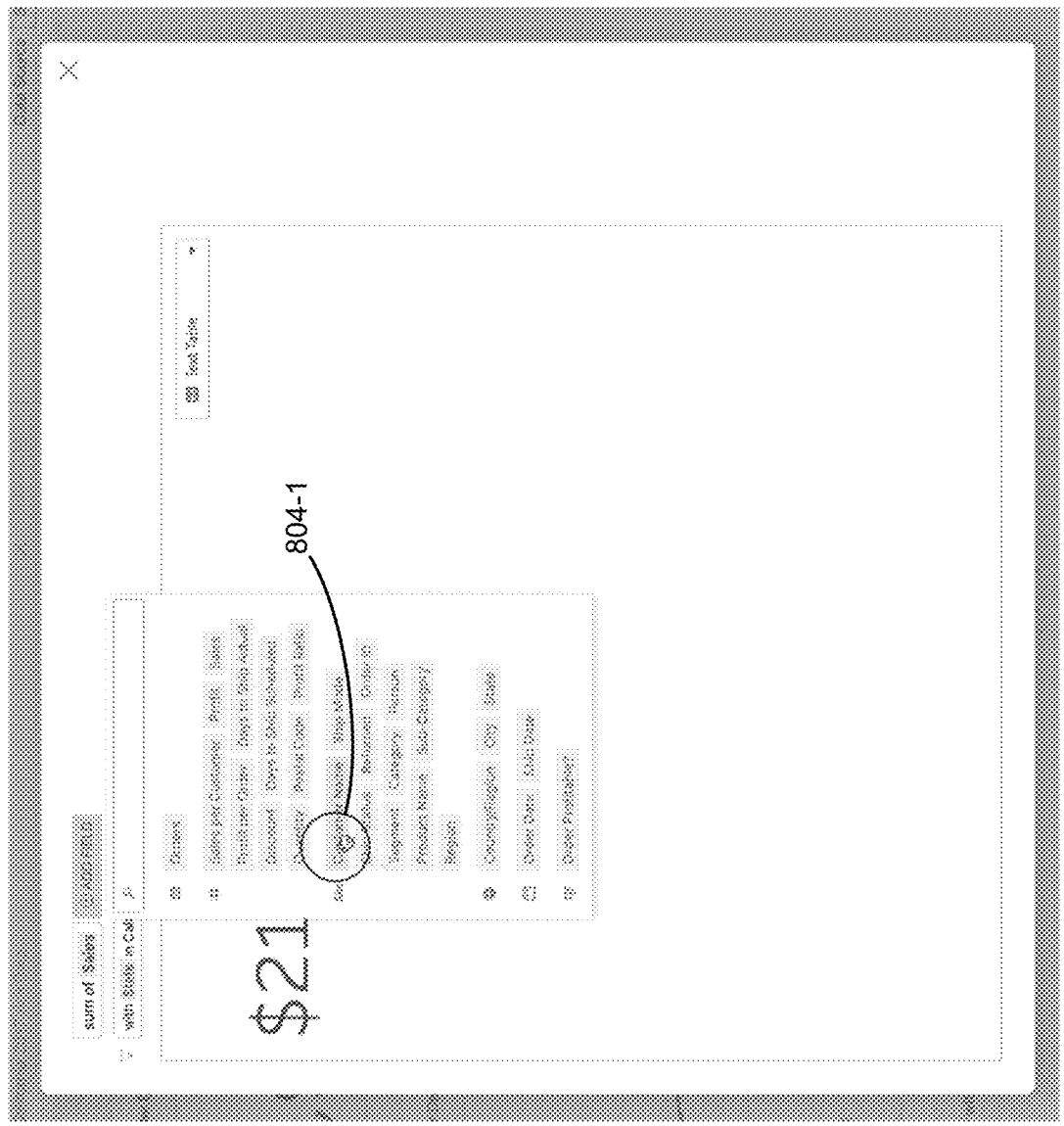

FIG. 8B illustrates a selection of a data field 804-1 (e.g., Customer Name) suggested by the drop-down menu 806. In some implementations, when the user scrolls over the data field 804-1, the data field 804-1 is highlighted. In some implementations, when the user scrolls over the data field 804-1, the data field 804-1 is bolded. The user may select the data field by pressing any one of the keys discussed above, such as clicking, or pressing ENTER when the data field is highlighted.

Figure 8C:
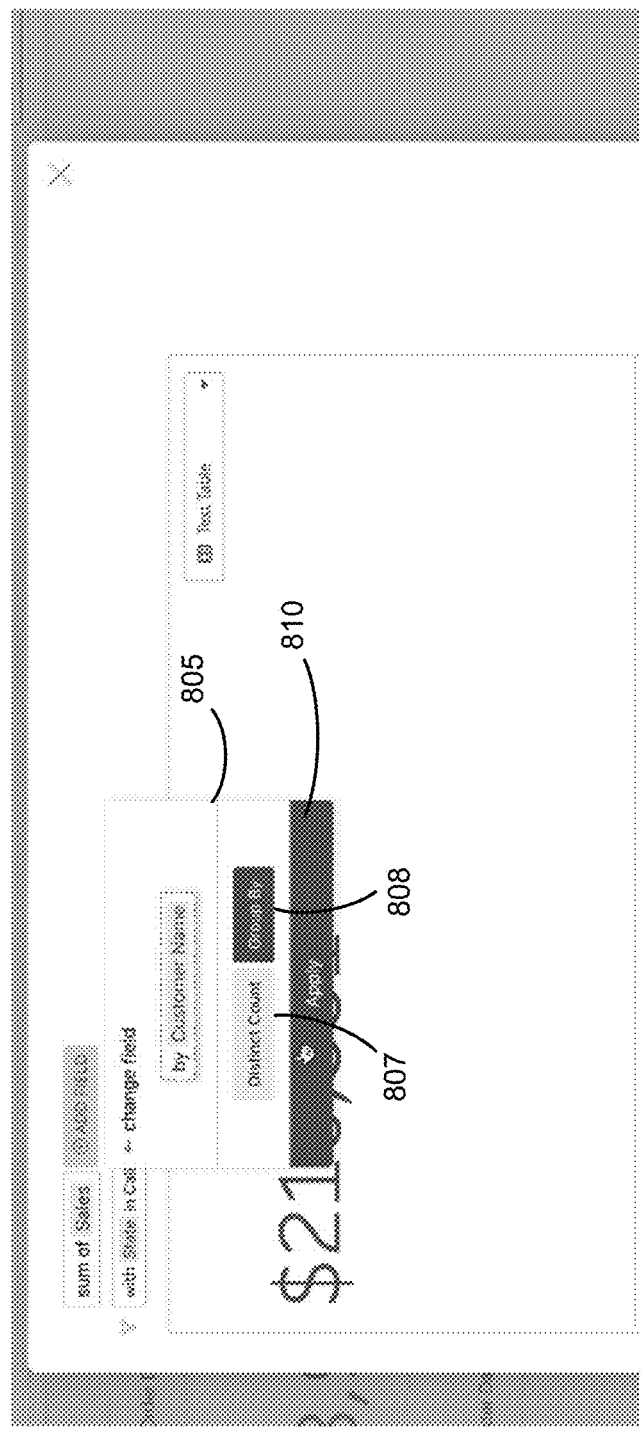

FIG. 8C illustrates building an expression using the selected data field 80-4-1 (i.e., Customer Name). A sub-window 805 is presented. In some implementations, the sub-window 805 overlays a portion of the window 712. Because Customer Name is a dimension data field, and it is not being used as a filter, the sub-window 805 presents two option buttons: the first button 807 gives the option to compute a count of distinct values for the Customer Name data field; the second button 808 gives the option to perform grouping by the Customer Number data field (thereby generating a distinct visual mark for each distinct Customer Name data value). As shown in FIG. 8C, the Group By option 808 is currently highlighted, and ready for selection. In some implementations, the sub-window 805 includes an Apply button 810 to make the selection.

Figure 8D:
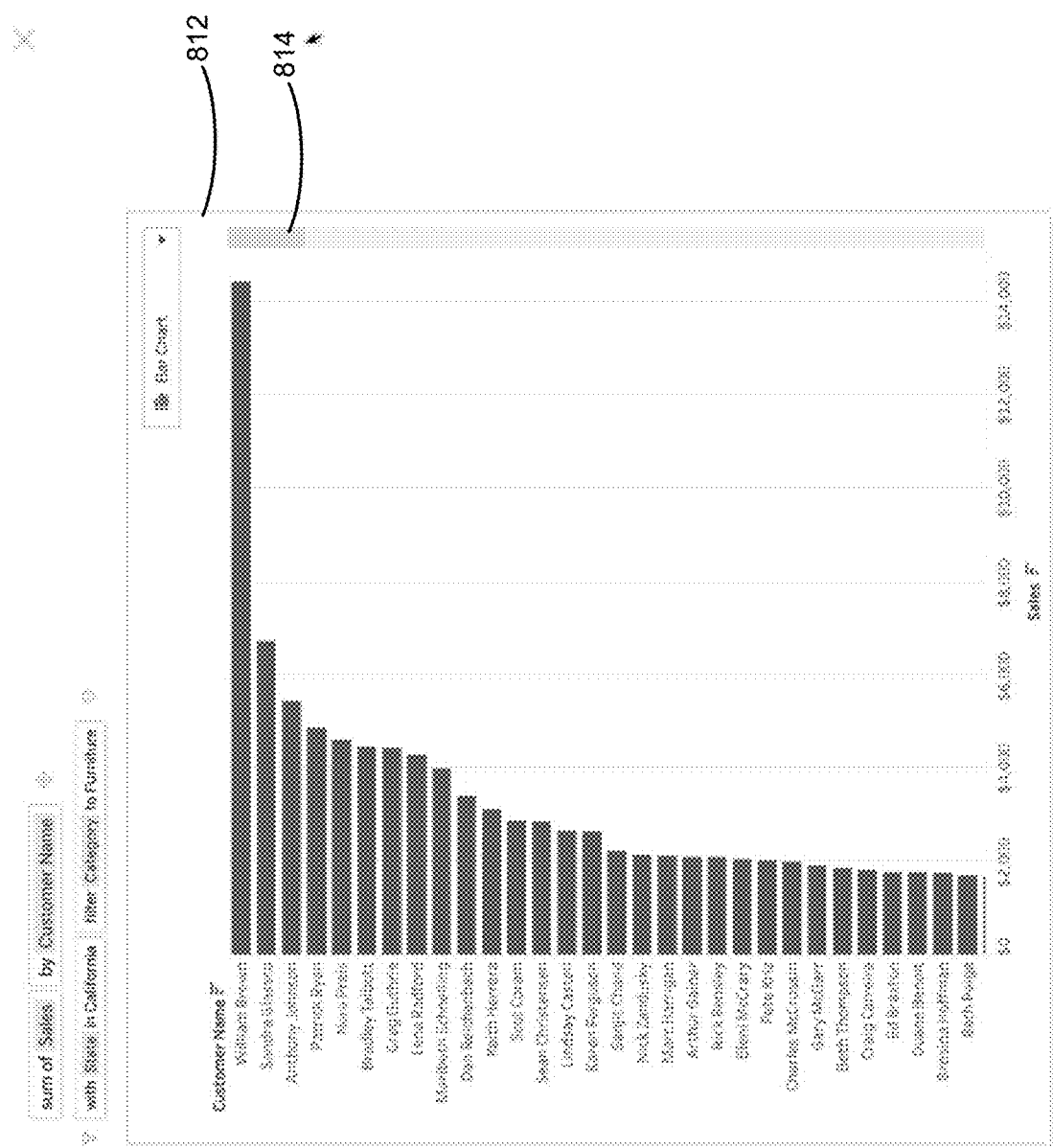

FIG. 8D applies the Group By selection from FIG. 8C. The visualization 812 shows the sum of furniture sales grouped by customer names in the state of California. In some implementations, the visualization 812 presents the data in a specific order (e.g., highest to lowest, most to fewest, or alphabetically). In FIG. 8D, the visualization 812 is a bar chart with customers arranged from highest sales to lowest sales. In some instances, the visualization 812 may limit the number of customers (e.g., the top 10 customers, the bottom 10 customers, the 10 most relevant customers, or the 10 most recent customers). In some implementations, the visualization 812 may have a scroll bar 814. In this example, the scroll bar 814 allows the user to see all data in the visualization 812 by scrolling down the visualization 812.

Figure 9A:
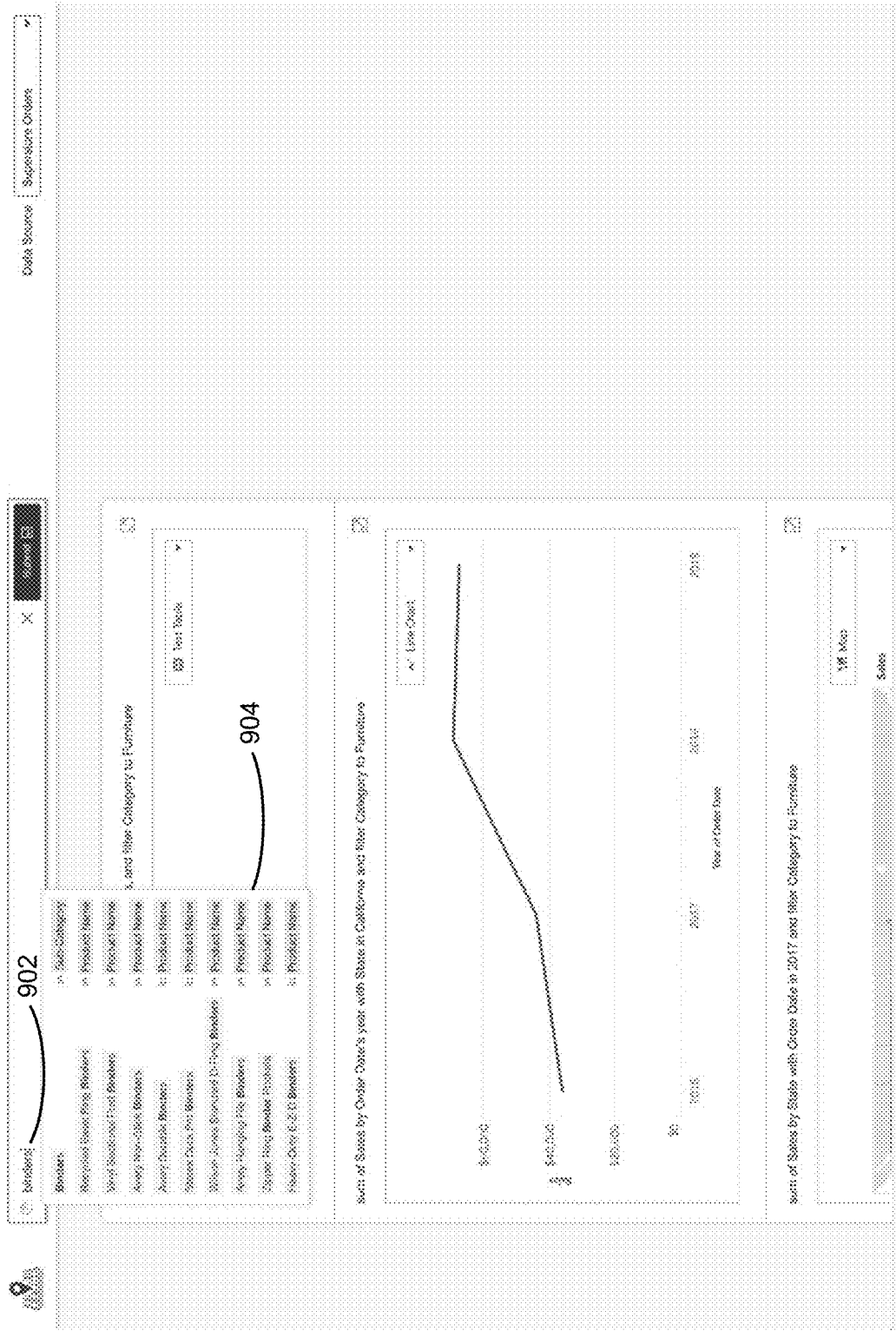
FIGS. 9A-9C provide a series of screen shots for interactions with a graphical user interface according to some implementations.
Figure 9B:
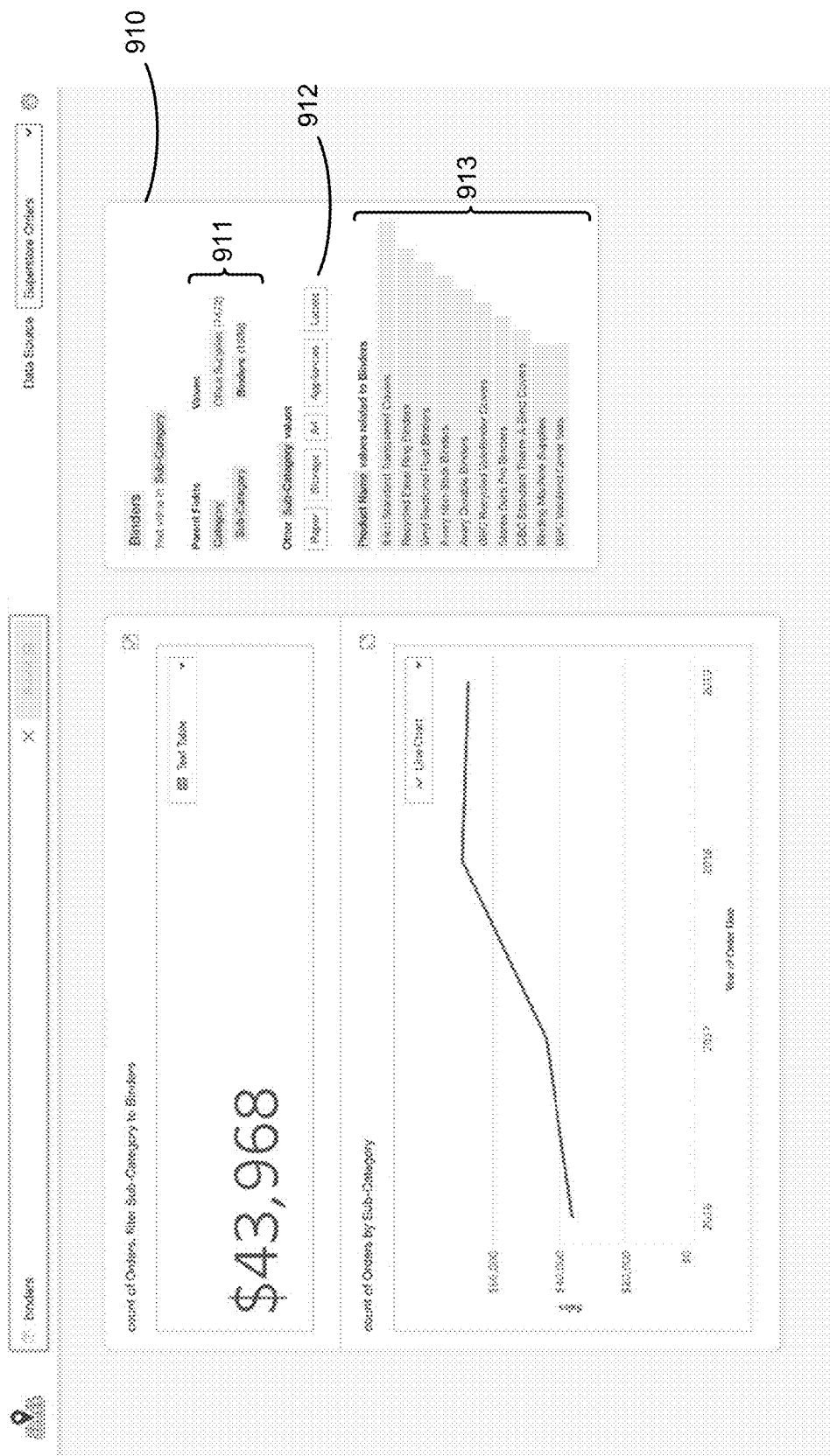
Figure 9C:

FIGS. 9A-9C provide a series of screen shots for interactions with a graphical user interface according to some implementations. FIG. 9A illustrates another method of searching for a data value in an input box 124. In this example, the user may input text relating to a general category or sub-category. In some implementations, the user may not be asking a question, or making a statement, but may want general information about a category or sub-category. In this example, the user inputs the text 902 "binders" into the input box 124. In some implementations, a drop-down menu 904 presents the user with a series of data values relating to or containing the text 902 "binders." For example, the data values may correspond to a category (e.g., the binders sub-category), or the data values may correspond to a specific product or service that includes the text 902 "binders" in the name (e.g., recycled easel ring binders, vinyl sectional post binders, or Avery non-stick binders).

In some implementations, when the user selects a data value from the drop-down menu 904, the user interface displays a window 910 with further information related to the selection. The window 910 displays the hierarchical relationship of the relevant data fields, and the relevant data values (e.g., "Binders" is a Sub-Category, which is a child of Category, and the relevant Category is "Office Supplies"). In some implementations, the window 910 presents additional values 912 for the same data field (data values for Sub-Category). For example, the additional values 912 in the Sub-Category data field may be paper, storage, art, appliances, and/or labels. In some implementations, the additional values 912 may be one or more other data field or fields related to the selection. In some implementations, data values for other data fields may be presented. These data values 913 may be other values related to the text 902. In some implementations, a data value may be commonly associated with the text 902 (e.g., the most commonly purchased items with the selected value, values needed with the selected value, or applications or supplemental items for the selected value).

In some implementations, the dashboard may be updated to reflect one or more selections in the window 910. In some implementations, the visualizations provide a comparison of the selected data value with other data values (e.g., categories, sub-categories, or products). For example, the visualization 914 is a total count of the orders of the sub-category Binders. The visualization 914 may be further filtered by providing more information in the input box (e.g., by year, by region or state, or by customer). In some implementations, the visualization 915 compares the Sub-Category "binders" with other data values in the same data field (e.g., sub-category).

Figure 10A:
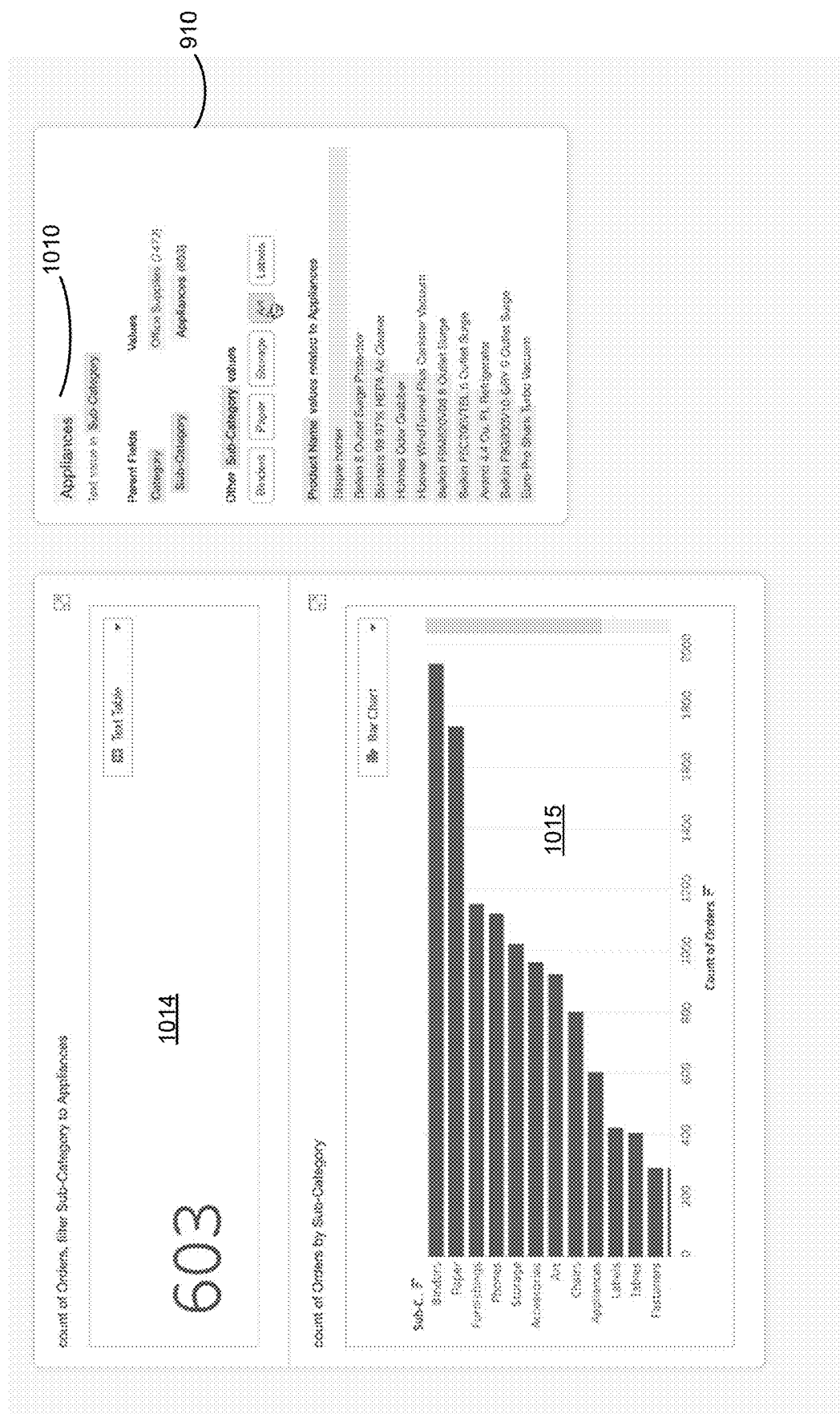
FIGS. 10A and 10B provide a series of screen shots for interactions with a graphical user interface according to some implementations.
Figure 10B:
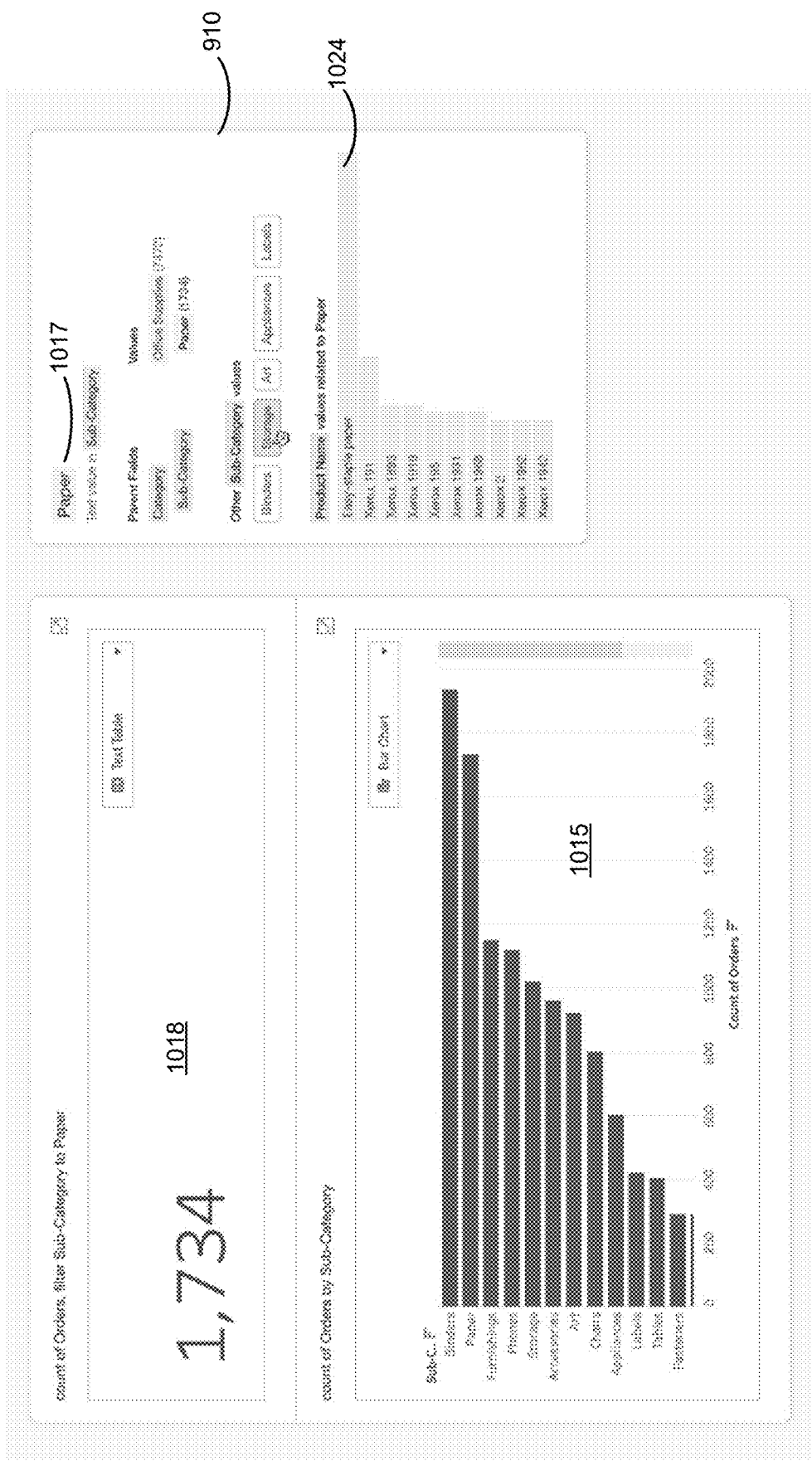

FIGS. 10A and 10B provide a series of screen shots for interactions with a graphical user interface according to some implementations. Specifically, FIG. 10A illustrates the selection of an alternative data value (i.e., Appliances) from the window 910. In this example, by selecting an alternative value, the dashboard is automatically updated to reflect the new selection. In this example, the user selected the alternative value button "Appliances" 1008 (see FIG. 9C). In this example, window 910 is updated to reflect the change, and the data visualization 1014 is updated as well. Note that the second data visualization 1015 is the same as the second data visualization in FIG. 9C because they show the data for all of the Sub-Category data values.

FIG. 10B is another illustration of updating a dashboard and window to visualize a different selected data value. As shown in FIG. 10B, the dashboard is updated each time the user selects a new data value. In this example, window 910 has been updated to reflect the data value 1017 "paper," and the dashboard is updated to reflect the change in data value and the respective visualizations. The first data visualization 1018 now shows data for Paper.

Figure 11A:
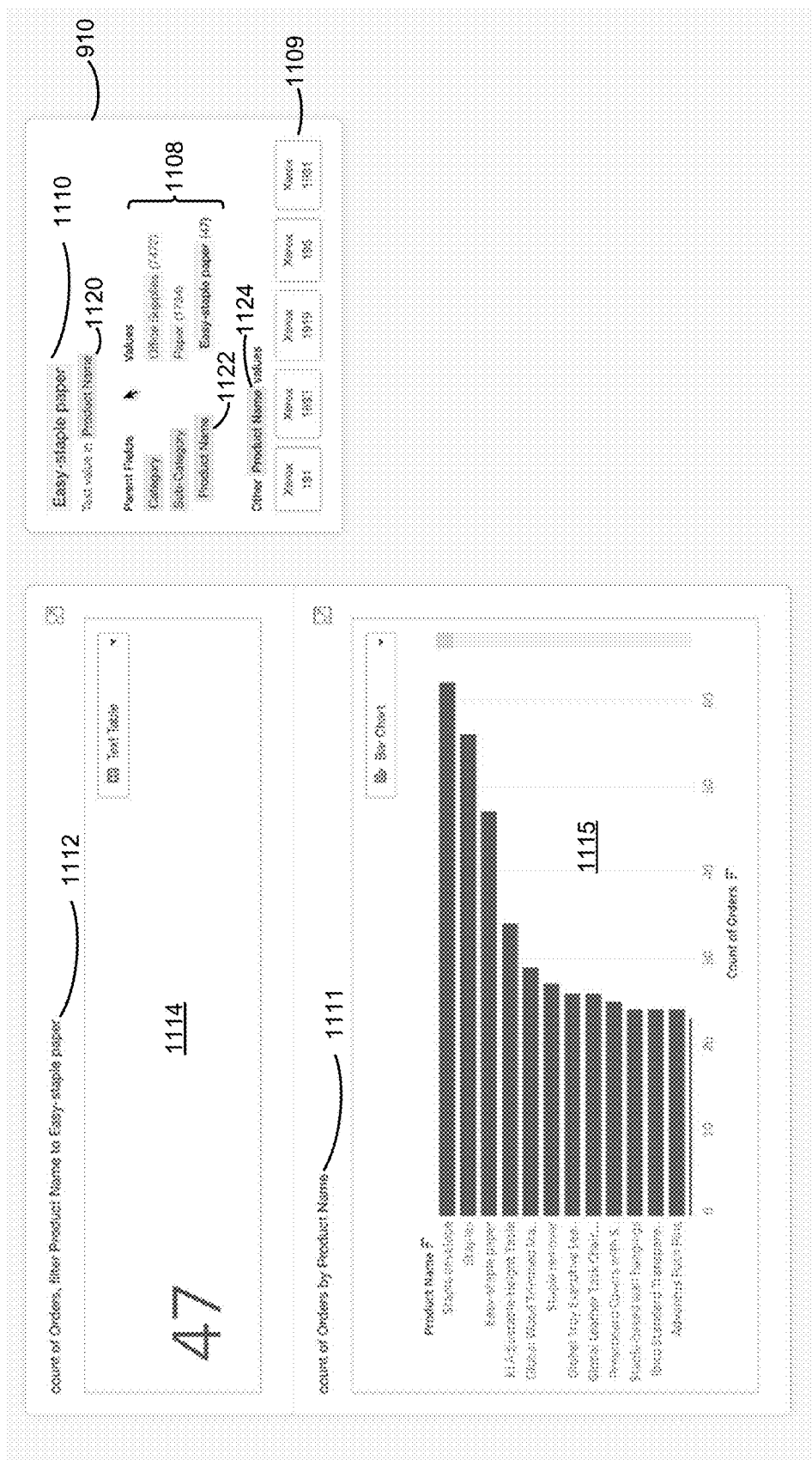
FIGS. 11A and 11B provide a series of screen shots for interactions with a graphical user interface according to some implementations.
Figure 11B:
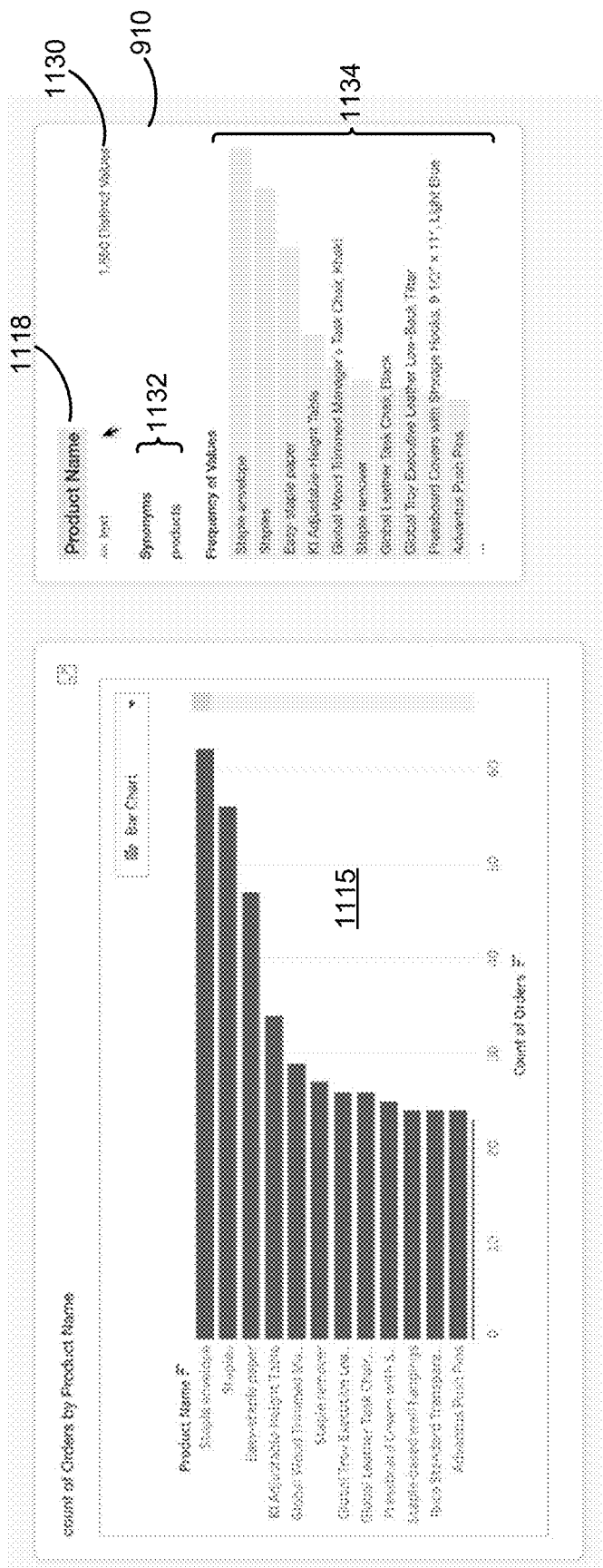

In FIG. 10B, the window 910 displays a list of Product Name data values within the Sub-Category of Paper. One of the Product Name data values is "Easy-staple paper" 1024. FIGS. 11A and 11*b* illustrate how the user interface updates when a user selects this specific Product Name data value. The window 910 updates to display information about the "Easy-staple paper" data value 1110. This includes hierarchical information 1108 about the data field Product Name and the data value "Easy-staple paper." The window 910 also displays other data values 1109 for the Product Name data field.

In some implementations, each visualization presented in the dashboard has a corresponding text-based description 1112 and 1111. In each visualization, the corresponding description 1112 and 1111 identifies in words what is displayed: "count of orders, filter product name to easy-staple paper" and "count of orders by product name."

In some implementations, the dashboard updates to provide information for the data value 1110. The first data visualization 1114 now shows the total number of orders that include the select product 1110, and the second data visualization 1115 now shows a bar chart of orders with various products (including the selected product name 1110).

Within the window 910, most of the displayed text comprises user-selectable affordances, which update the displayed data when selected. For example, the Product Name affordances 1120, 1122, and 1124 can be selected in order to provide information about Product Name data. Upon user selection of one of the Product Name affordances 1120, 1122, or 1124, the user interface updates, as shown in FIG. 11B.

In FIG. 11B, the first data visualization 1114 is no longer displayed because the user has selected a data field rather than a specific data value. The second data visualization 1115 remains the same because it still shows a bar chart of order by Product Name.

In FIG. 11B, the window 910 is updated to provide information about the Product Name data field 1118. The sub-window indicates (1130) that there are 1850 distinct data values for the Product Name data field 1118, and specifies the synonyms 1132 for "Product Name." The window 910 also provides a histogram 1134 to show the distribution of data values for the Product name data field 1118. In the illustrated implementation, the histogram bars are shaded (e.g., light blue), and overlaid by the actual data values. There are 1850 distinct data values (see the indicator 1130), so only a subset of the data values can be displayed on the screen. In this example, the Product Name data values are listed in descending sequence based on the number of customer orders in which they appear, and only the top 10 are shown. Some implementations include a scroll bar to see any of the other data values. Some implementations allow a user to specify an order and/or a filter for the displayed data values.

Figure 12A:
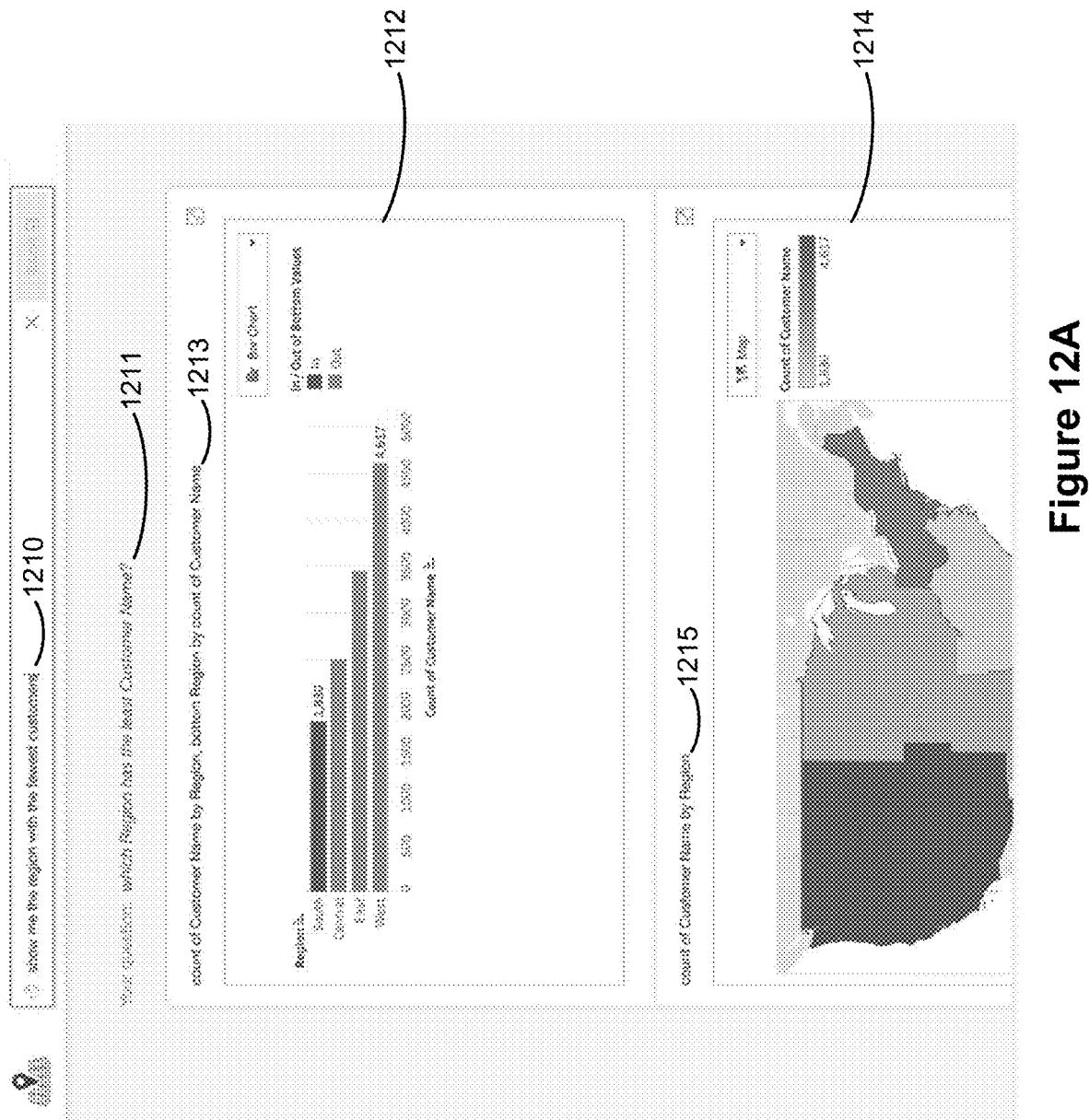
FIGS. 12A and 12B provide a series of screen shots for interactions with a graphical user interface according to some implementations.

FIG. 12A provides an example of a natural language expression and the data visualization that is displayed. In this example, the user inputs the command 1210 "show me the region with the fewest customers." The computing system identifies three relevant terms: "region," "fewest," and "customers." In some implementations, the dashboard displays the user's command in the form of a question 1211 (e.g., "your question: which region has the least Customer Name"). Displaying the command in the form of a question 1211 shows the user how the command has been interpreted.

In this example, the dashboard displays a plurality of visualizations. The first data visualization 1212 is a bar chart of the regions, with the region having the fewest customers at the top. Adjacent to the first data visualization 1212 is descriptive text 1213, which identifies what is displayed in the first data visualization 1212. In some implementations, or under a different set of user preferences, the first data visualization is a text table that lists just the answer to the question asked (i.e., "South" is the region with the fewest customers).

The second data visualization 1214 is a map that graphically shows the four regions, and the regions are color encoded to indicate the number of customers. The adjacent text 1215 provides a textual description of the displayed data visualization.

Figure 12B:
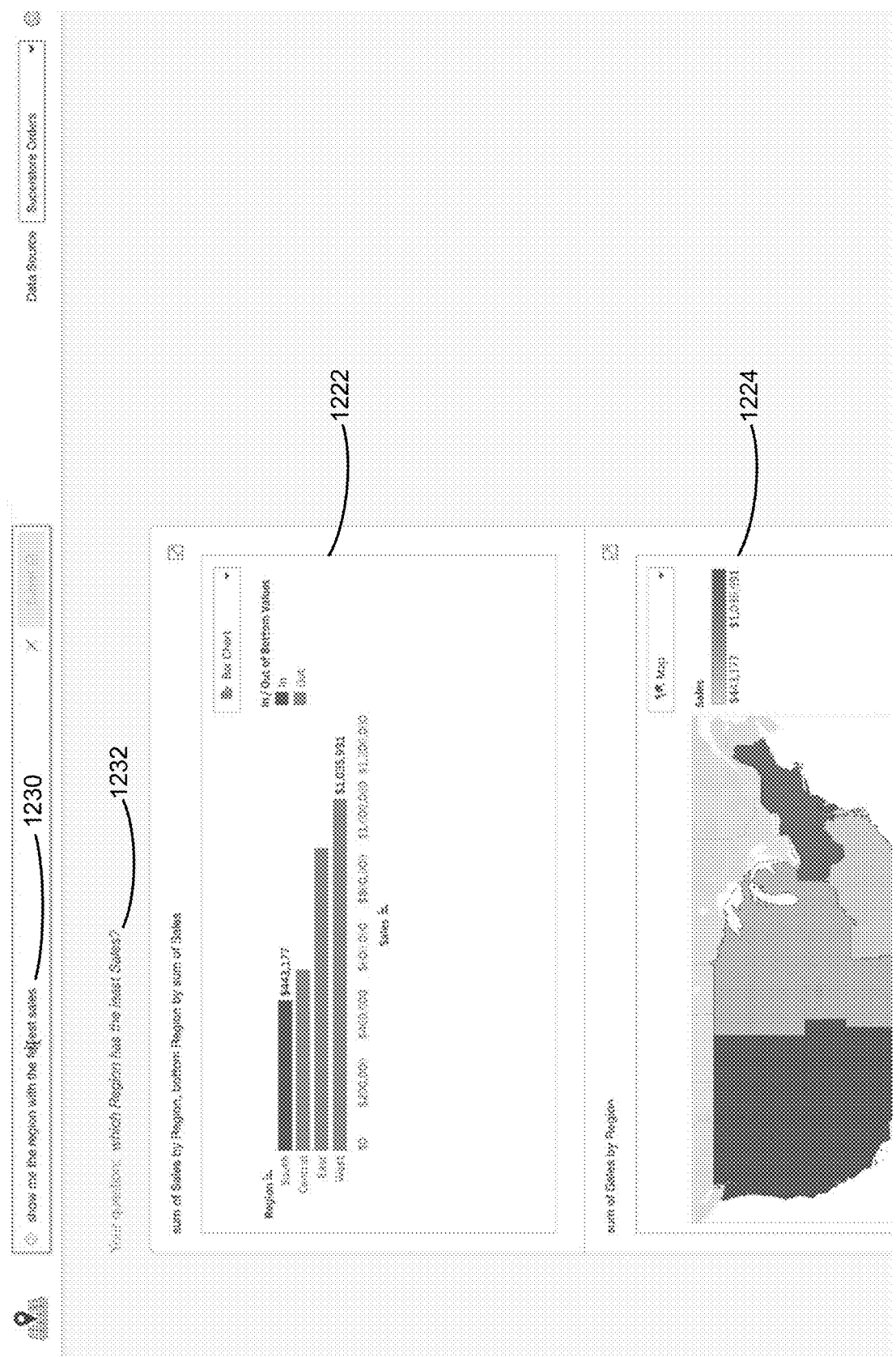
Figure 13A:
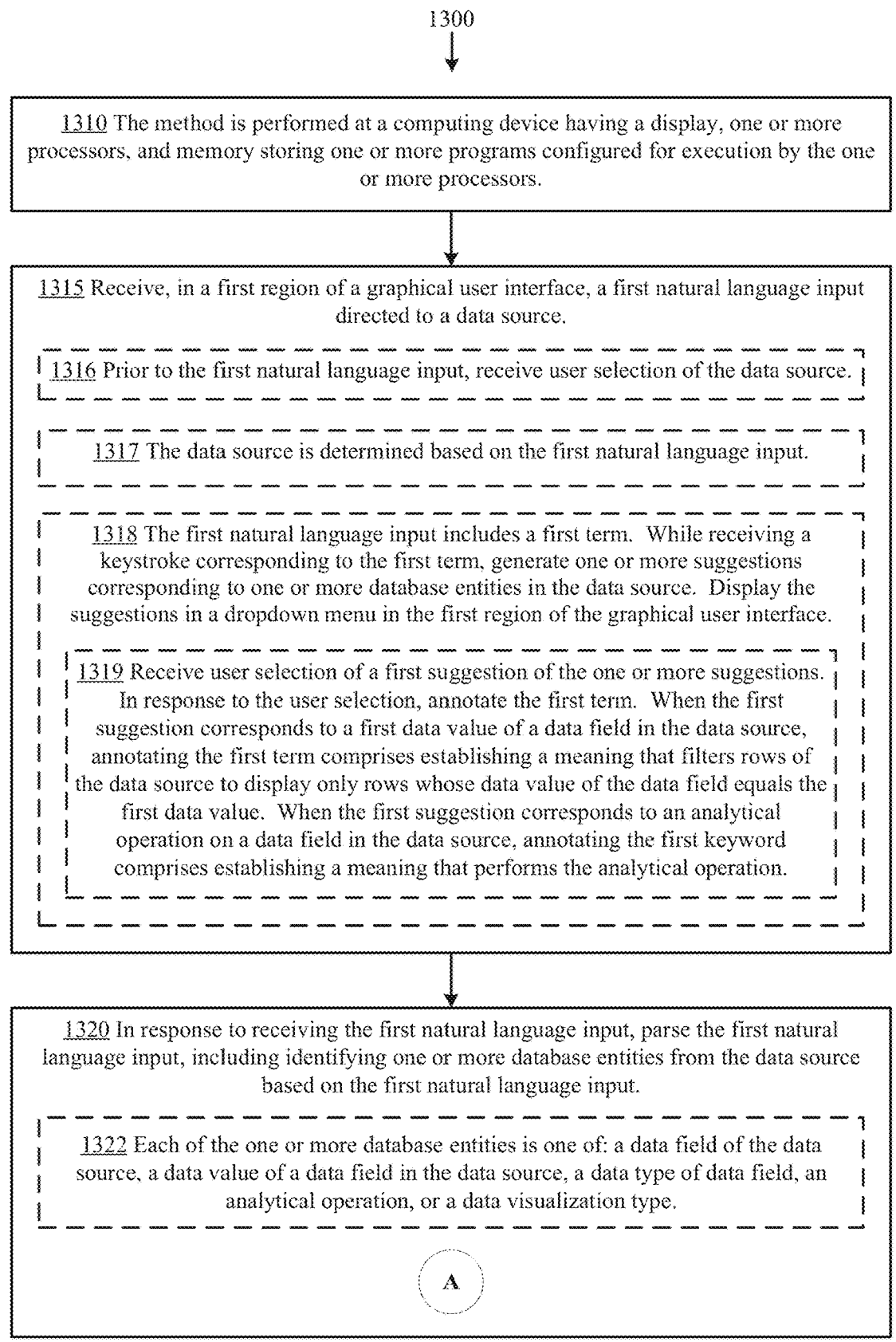

In FIG. 12B, the user changes the command 1210 to a new command 1230, which specifies "sales" rather than "customers." In this example, the computing system displays the command in the form of a question 1232 (e.g., "which Region has the least Sales?"). The dashboard regenerates the two visualizations to display a new bar chart 1222 based on sales and a new map 1224 based on sales. In some instances, the newly generated data visualizations have different visualization types than the previous visualizations 1212 and 1214 (e.g., a bar chart versus a line graph).

FIGS. 13A-13D provide a flow chart of systems and methods for generating a dashboard according to some implementations. The method 1300 is performed (1310) at a computing device having a display, one or more processors, and a memory storing one or more programs configured for execution by the one or more processors. The device receives (1315), in a first region (e.g., a natural language input region) of a graphical user interface, a first natural language input (e.g., an utterance, a command, or a question). For example, the natural language input can be a phrase such as "Furniture sales in California." It can also be a question such as "Where do we sell the most paper?" The input is directed to a data source. In some instances, prior to the first natural language input, a user selects (1316) the data source is received. In some implementations, the user can select multiple data sources. In some instances, the data source is determined (1317) (e.g., automatically and without user intervention) based on the first natural language input. For example, the computing device can determine what data sources are known to the user (e.g., based on user login, user identification, and/or company information) and what data sources include the data fields in the natural language input.

In some instances, the first natural language input includes a first term. While receiving a keystroke corresponding to the first term, the device generates one or more suggestions corresponding to one or more database entities in the data source. The device displays the suggestions in a dropdown menu in the first region of the graphical user interface. In some instances, the user input selects (1319) a first suggestion of the one or more suggestions. In response to the user selection, the device annotates the first term. In some implementations, when the first suggestion corresponds to a first data value of a data field in the data source, the first term is annotated by establishing a meaning (e.g., a command or an operation) that filters rows of the data source to display only rows whose data value of the data field equals the first data value. In some implementations, when the first suggestion corresponds to an analytical operation of a data field in the data source, the first keyword is annotated. In some implementations, annotating the first keyword includes establishing a meaning (e.g., a command or an operation) that performs the analytical operation.

In some implementations, in response to receiving the first natural language input, a computing device parses (1320) the first natural language input. Parsing the input identifies one or more database entities from the data source. In some implementations, each of the one or more database entities is (1322) one of: a data field from the data source, a data value of a data field in the data source, a data type of a data field (e.g., a dimension data field, a measure data field, a date/time field, or a geographic data field), an analytical operation (e.g., aggregate, group, filter, limit, or sort), or a data visualization type.

For each of the database entities, the computing system determines (1323) (e.g., assigns) one or more respective analytical operations (e.g., aggregate, group, filter, limit, sort, calculation, or count) for the respective database entity. For example, the database entity "Sales" can be mapped to an aggregate operation and the database entity "California" can be treated as a filter value of a filter operation, which is applied to the data field "State." Alternatively, the database entity "California" can be handled as part of a grouping operation, whereby data rows containing the data field "State" are grouped together according to respective data values (e.g., all of the data for California is grouped together. For example, a filter operation may filter rows of the data source to display only rows whose data value of the data field "Category" equals the data value "Furniture." In another example, a grouping operation includes grouping data rows according to respective data values of the data field "Category." Accordingly, in this grouping operations, data rows having the data value "Furniture" are grouped together. The sales of Furniture can be calculated by aggregating the sales for each of the data rows having the data value "Furniture." In some implementations, determining one or more analytical operations for the database entity also includes determining an analytical concept for the database entity (e.g., using a lexicon, a semantic model for the data source, synonyms that have been identified, user curated content, and/or user definitions).

In some implementations, when the one or more respective analytical operations for a database entity includes a filter operation, a data visualization is generated (1324) by filtering rows of the data source to display only rows whose data value of a first data field equals a first data value. In some implementations, the one or more respective analytical operations include a sort operation, a bar chart is generated (1325) that includes data bars arranged in an ascending or descending order according to data values of a data field.

The device generates (1326) a first dashboard (e.g., a scrollable dashboard), which includes a first plurality of data visualizations, each data visualization in the first plurality of data visualizations corresponding to a distinct combination of analytical operations. In some implementations, each of the first plurality of data visualizations has (1327) a respective data visualization type that is one of: a bar chart, a Gantt chart, a line chart, a map, a pie chart, a scatter plot, a tree map, or a text table.

A first visualization has (1328) a first interpretation. In some implementations, the computer system receives (e.g., detects) user interaction with the first data visualization (e.g., the user selects the data visualization, or selects the first interpretation, or selects an interactive icon next to the first interpretation). In response to the user interaction, the device displays in a second user interface (e.g., a pop-up window), a second graphical user interface that is distinct from the first graphical user interface. The second graphical user interface includes the first data visualization and an interpretation region. The interpretation region includes one or more phrases that define the first data visualization.

In some implementations, the interpretation region comprises a data field interpretation region and/or a filter interpretation region. The data field interpretation region displays how the natural language system interprets the first natural language input in light of the selected data source The filter interpretation region displays any filters that are applied to data fields of the data source to generate the first data visualization.

The one or more phrases include grouping and/or filter operations that are applied to one or more data fields of the first data visualization. In some instances, the device receives (1329) user input in the interpretation region of the second graphical user interface to modify the first data visualization. The user input includes one or more of: removing an existing data field term that defines the first data visualization, adding a new data field term, replacing an existing data field term with another data field term from the data source, or removing one of the phrases that defines the first data visualization. In response to the user input, the device generates a second data visualization and updates the display of the second graphical user interface by replacing the first data visualization with the second visualization and updating the one or more phrases in the interpretation region based on the user input.

In some implementations, the device updates (1330) the display of the dashboard by replacing the first data visualization with the second data visualization and updating the first interpretation while maintaining the display of (e.g., continuing to display) other visualizations in the first plurality of data visualizations.

In some implementations, the device displays (1331), in the interpretation region, a list of data fields in the data source and receive user selection of a first data field from the data fields. In some implementations, the list of data fields is arranged by type (e.g., measures, dimensions, date/time fields, true/false data fields, and geographic fields).

The device displays (1332) the first dashboard in a second region of the graphical user interface, distinct from the first region. In some implementations, the dashboard includes data visualizations that correspond to all of the distinct combinations of analytical operations for the entities. In some implementations, the dashboard includes a scrollable feature that enables the user to scroll through the dashboard to view all the data visualizations that have been generated. In some implementations, the computing device ranks the distinct combinations and displays a subset of visualizations corresponding to the highest ranked interpretations (e.g., the top 4 interpretations or the top 6 interpretations). The ranking can be determined based on a user profile, previous user interactions with the computing device, and/or user preferences (e.g., the user has explicitly or implicitly indicated how the user would like an entity to be interpreted).

In some implementations, the device displays (1333), adjacent to (e.g., above, below, or next to) each of the data visualizations, a corresponding interpretation comprising a respective textual description of the respective data visualization. In some implementations, the text description identifies data fields of the data source and analytical operations (e.g., sum, filter, or sort) that are performed on the data fields.

In some implementations, the device receives (1334) user input in the first region to modify the first natural language input (e.g., the user modification includes adding a string of letters/text/alphanumeric characters to the first natural language input or changing an existing term in the first natural language input). In response to the input, the device parses the modified natural language input (e.g., into terms), including identifying a second database entity in the data source based on the modified natural language input (e.g., for the data source "Superstore Orders," "Furniture" is a data value of the data field "Category," "Sales" is a measure data field, and California is a data value of the data field "State").

The device then generates a second dashboard that includes a second plurality of data visualizations. The second plurality of data visualizations includes at least one data visualization that is distinct from the first plurality of data visualizations by adding an analytical operation corresponding to the second database entity and replacing display of the first dashboard with the second dashboard. For example, the dashboard is updated whenever the user makes a change in the natural language input phrase. The disclosed implementations distinguish from currently available business dashboards, in which data visualizations are assembled on a single dashboard for a user to view and monitor, but do not allow the user to interact with/explore the data.

In some implementations, the second plurality of data visualizations is (1335) distinct from the first plurality of data visualizations.

Each of the above identified executable modules, applications, or sets of procedures may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, the memory 206 stores a subset of the modules and data structures identified above. Furthermore, the memory 206 may store additional modules or data structures not described above.

The terminology used in the description of the invention herein is for the purpose of describing particular implementations only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain the principles of the invention and its practical applications, to thereby enable others skilled in the art to best utilize the invention and various implementations with various modifications as are suited to the particular use contemplated.

What is claimed is:

1. A method of generating a dashboard using a natural language interface, comprising:
    at a computing device having a display, one or more processors, and memory storing one or more programs configured for execution by the one or more processors:
        receiving, in a first region of a graphical user interface, a first natural language input directed to a data source;
        in response to receiving the first natural language input:
            parsing the first natural language input, including identifying one or more database entities from the data source based on the first natural language input;
            for each of the database entities, determining one or more respective analytical operations for the respective database entity, each of the analytical operations comprising: a sort operation, a grouping operation, a filter operation, an aggregate operation, or a count operation;
            generating a first dashboard having a first plurality of data visualizations, each data visualization in the first plurality of data visualizations (i) corresponding to a distinct combination of the analytical operations applied to the one or more database entities and (ii) having a respective data visualization type; and
            displaying the first dashboard in a second region of the graphical user interface, distinct from the first region.

2. The method of claim 1, wherein each of the one or more database entities comprises one of:
    a data field from the data source;
    a data value of a data field in the data source;
    a data type of a data field;
    an analytical operation; or
    a data visualization type.

3. The method of claim 1, wherein each of the first plurality of data visualizations has a respective data visualization type that is one of: a bar chart, a Gantt chart, a line chart, a map, a pie chart, a scatter plot, a tree map, or a text table.

4. The method of claim 1, wherein displaying the first dashboard further comprises displaying, adjacent to each of the data visualizations, a corresponding interpretation comprising a respective textual description of the respective data visualization.

5. The method of claim 4, wherein the first plurality of data visualizations includes a first data visualization having a first interpretation, the method further comprising:
    receiving a user interaction with the first data visualization; and
    in response to the user interaction, displaying, in a second graphical user interface, the first data visualization and an interpretation region including one or more phrases that define the first data visualization, the one or more phrases including grouping and/or filter operations that are applied to one or more data fields of the first data visualization.

6. The method of claim 5, further comprising:
    receiving user input in the interpretation region of the second graphical user interface to modify the first data visualization, the user input including one or more of:
        removing an existing data field term that defines the first data visualization;

adding a new data field term;
replacing an existing data field term with another data field term from the data source; and
removing one of the phrases that defines the first data visualization; and
in response to the user input:
  generating a second data visualization; and
  updating display of the second graphical user interface by (i) replacing the first data visualization with the second data visualization and (ii) updating the one or more phrases in the interpretation region based on the user input.

7. The method of claim 6, further comprising updating display of the first dashboard by replacing the first data visualization with the second data visualization and updating the first interpretation while maintaining display of other data visualizations in the first plurality of data visualizations.

8. The method of claim 6, wherein receiving user input to modify the first data visualization further comprises:
  displaying, in the interpretation region, a list of data fields in the data source; and
  receiving user selection of a first data field from the list of data fields.

9. The method of claim 1, further comprising:
receiving user input in the first region to modify the first natural language input;
in response to the user input:
  parsing the modified natural language input, including identifying a second database entity in the data source based on the modified natural language input;
  generating a second dashboard having a second plurality of data visualizations, wherein the second plurality of data visualizations include at least one data visualization that is different from the first plurality of data visualizations by adding an analytical operation corresponding to the second database entity; and
  replacing display of the first dashboard with the second dashboard.

10. The method of claim 9, wherein the second plurality of data visualizations is distinct from the first plurality of data visualizations.

11. The method of claim 1, further comprising:
in accordance with a determination that the one or more respective analytical operations for a database entity include a filter operation, generating a data visualization by filtering rows of the data source to display only rows whose data value of a first data field equals a first data value.

12. The method of claim 1, further comprising:
in accordance with a determination that the one or more respective analytical operations include a sort operation, generating a bar chart that includes data bars arranged in an ascending or descending order according to data values of a data field.

13. The method of claim 1, further comprising, prior to the first natural language input, receiving user selection of the data source.

14. The method of claim 1, wherein the data source is determined based on the first natural language input.

15. The method of claim 1, wherein the first natural language input includes a first term, the method further comprising:
while receiving a keystroke corresponding to the first term, generating one or more suggestions corresponding to one or more database entities in the data source; and
displaying the suggestions in a dropdown menu in the first region of the graphical user interface.

16. The method of claim 15, further comprising:
receiving user selection of a first suggestion of the one or more suggestions; and
in response to the user selection, annotating the first term, wherein:
  when the first suggestion corresponds to a first data value of a data field in the data source, annotating the first term comprises establishing a meaning that filters rows of the data source to display only rows whose data value of the data field equals the first data value; and
  when the first suggestion corresponds to an analytical operation on a data field in the data source, annotating the first term comprises establishing a meaning that performs the analytical operation.

17. A computing device, comprising:
one or more processors; and
memory coupled to the one or more processors, the memory storing one or more programs configured to be executed by the one or more processors, the one or more programs including instructions for:
  receiving, in a first region of a graphical user interface, a first natural language input directed to a data source;
  in response to receiving the first natural language input:
    parsing the first natural language input, including identifying one or more database entities from the data source based on the first natural language input;
    for each of the database entities, determining one or more respective analytical operations for the respective database entity, each of the analytical operations comprising: a sort operation, a grouping operation, a filter operation, an aggregate operation, or a count operation;
    generating a first dashboard having a first plurality of data visualizations, each data visualization in the first plurality of data visualizations (i) corresponding to a distinct combination of the analytical operations applied to the one or more database entities and (ii) having a respective data visualization type; and
    displaying the first dashboard in a second region of the graphical user interface, distinct from the first region.

18. The computing device of claim 17, wherein each of the one or more database entities comprises one of:
a data field from the data source;
a data value of a data field in the data source;
a data type of a data field;
an analytical operation; or
a data visualization type.

19. The computing device of claim 17, wherein the one or more programs further comprise instructions for:
receiving user input in the first region to modify the first natural language input;
in response to the user input:
  parsing the modified natural language input, including identifying a second database entity in the data source based on the modified natural language input;
  generating a second dashboard having a second plurality of data visualizations, wherein the second plurality of data visualizations include at least one data visualization that is different from the first plurality of data visualizations by adding an analytical operation corresponding to the second database entity; and
  replacing display of the first dashboard with the second dashboard.

20. A non-transitory computer-readable storage medium storing one or more programs, the one or more programs comprising instructions, which when executed by a computing device, cause the computing device to perform operations comprising:
- receiving, in a first region of a graphical user interface, a first natural language input directed to a data source;
- in response to receiving the first natural language input:
  - parsing the first natural language input, including identifying one or more database entities from the data source based on the first natural language input;
  - for each of the database entities, determining one or more respective analytical operations for the respective database entity, each of the analytical operations comprising: a sort operation, a grouping operation, a filter operation, an aggregate operation, or a count operation;
  - generating a first dashboard having a first plurality of data visualizations, each data visualization in the first plurality of data visualizations (i) corresponding to a distinct combination of the analytical operations applied to the one or more database entities and (ii) having a respective data visualization type; and
  - displaying the first dashboard in a second region of the graphical user interface, distinct from the first region.

* * * * *